United States Patent
Froc

(10) Patent No.: US 10,193,652 B2
(45) Date of Patent: Jan. 29, 2019

(54) METHOD AND MASTER DEVICE FOR CONTROLLING ACCESS TO OUT-OF-BAND COMMUNICATION CHANNEL IN OPTICAL COMMUNICATIONS NETWORK

(71) Applicant: MITSUBISHI ELECTRIC CORPORATION, Tokyo (JP)

(72) Inventor: Gwillerm Froc, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/738,509

(22) PCT Filed: Jul. 7, 2016

(86) PCT No.: PCT/JP2016/003235
§ 371 (c)(1),
(2) Date: Dec. 20, 2017

(87) PCT Pub. No.: WO2017/006568
PCT Pub. Date: Jan. 12, 2017

(65) Prior Publication Data
US 2018/0167158 A1    Jun. 14, 2018

(30) Foreign Application Priority Data
Jul. 9, 2015    (EP) ............................ 15176079

(51) Int. Cl.
*H04J 14/02*    (2006.01)
*H04Q 11/00*    (2006.01)

(52) U.S. Cl.
CPC ...... *H04J 14/0275* (2013.01); *H04J 14/0272* (2013.01); *H04J 14/0273* (2013.01); *H04Q 11/0067* (2013.01); *H04Q 2011/0088* (2013.01)

(58) Field of Classification Search
CPC .............. H04J 14/0275; H04J 14/0273; H04Q 11/0067
See application file for complete search history.

(56) References Cited

U.S. PATENT DOCUMENTS 6,418,558 B1 *  7/2002  Roberts ................... G06F 17/14
                                                      725/129
6,807,188 B1 * 10/2004  Blahut .................. H04J 3/0682
                                                      348/E7.07

(Continued)

*Primary Examiner* — Dzung D Tran
(74) *Attorney, Agent, or Firm* — Birch, Stewart, Kolasch & Birch, LLP

(57) ABSTRACT

The invention relates to a method for controlling access to an out-of-band communication channel in an optical communications network comprising a master device and slave devices connected to the master device via optical fiber, the optical communications network being adapted to enable in-band communications, the out-of-band communication channel being intended to enable transmissions of signalling signals with respect to the in-band communications. The master device processes signalling signals transmitted by said slave devices without access restriction to the out-of-band communication channel; and upon detecting a collision between signalling signals transmitted by slave devices concurrently accessing the out-of-band communication channel, the master device initiates a temporary time-slotted access to the out-of-band communication channel, so as to restrict access to the out-of-band communication channel by time slot distribution among slave devices likely to concurrently access the out-of-band communication channel using carrier wavelengths substantially identical as those having involved the detected collision.

19 Claims, 7 Drawing Sheets

(56) References Cited

U.S. PATENT DOCUMENTS

| | | | |
|---|---|---|---|
| 2009/0060503 A1* | 3/2009 | Yin | H04J 14/0226 398/48 |
| 2012/0275792 A1* | 11/2012 | Nandiraju | H04L 12/2801 398/66 |
| 2013/0279914 A1* | 10/2013 | Brooks | H04Q 11/0067 398/66 |
| 2013/0322869 A1* | 12/2013 | Hirth | H04B 10/071 398/16 |
| 2014/0270772 A1* | 9/2014 | Lutgen | H04B 10/272 398/66 |

* cited by examiner

[Fig. 1]
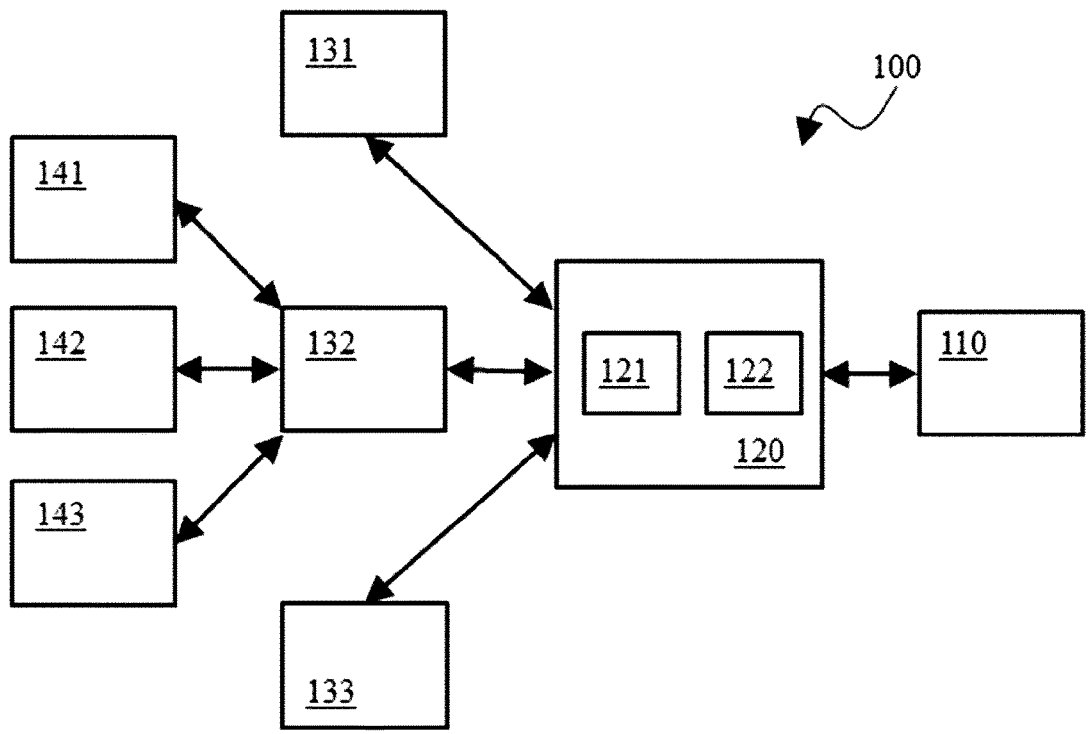
[Fig. 2]
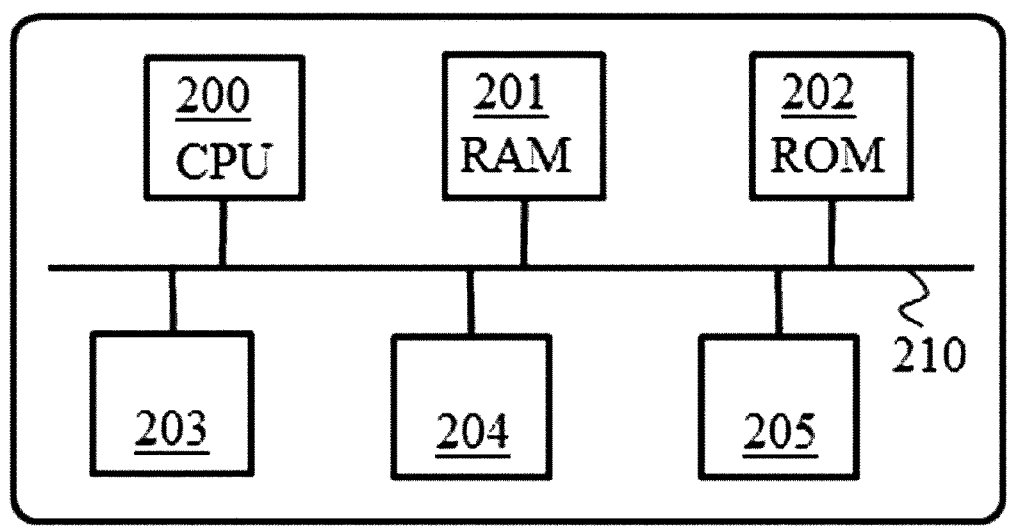

[Fig. 3]
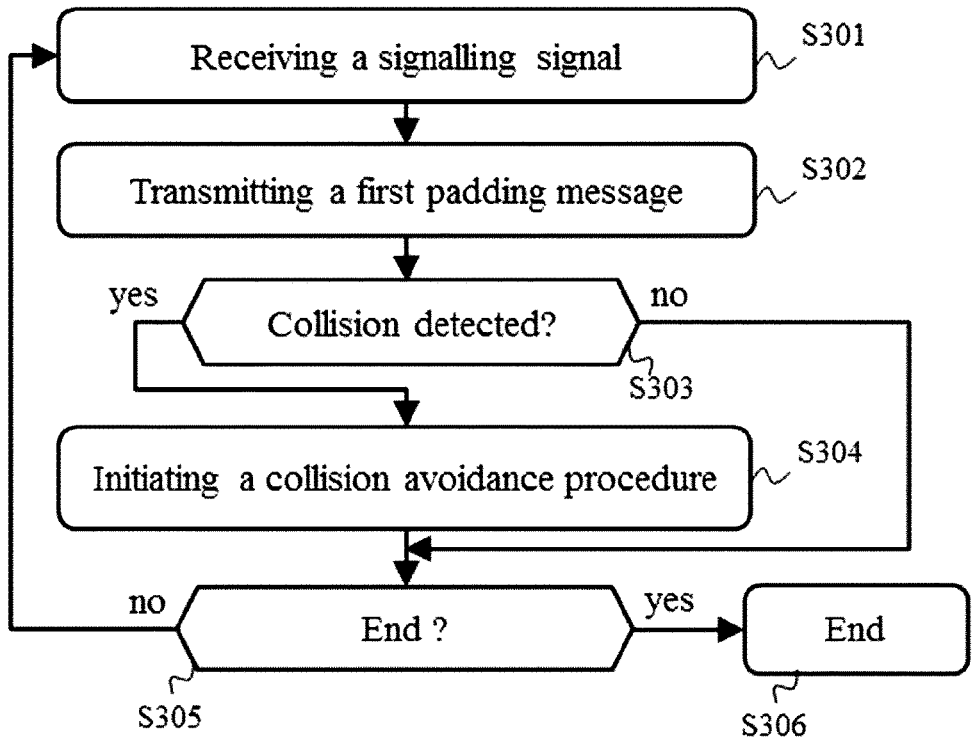
[Fig. 4]
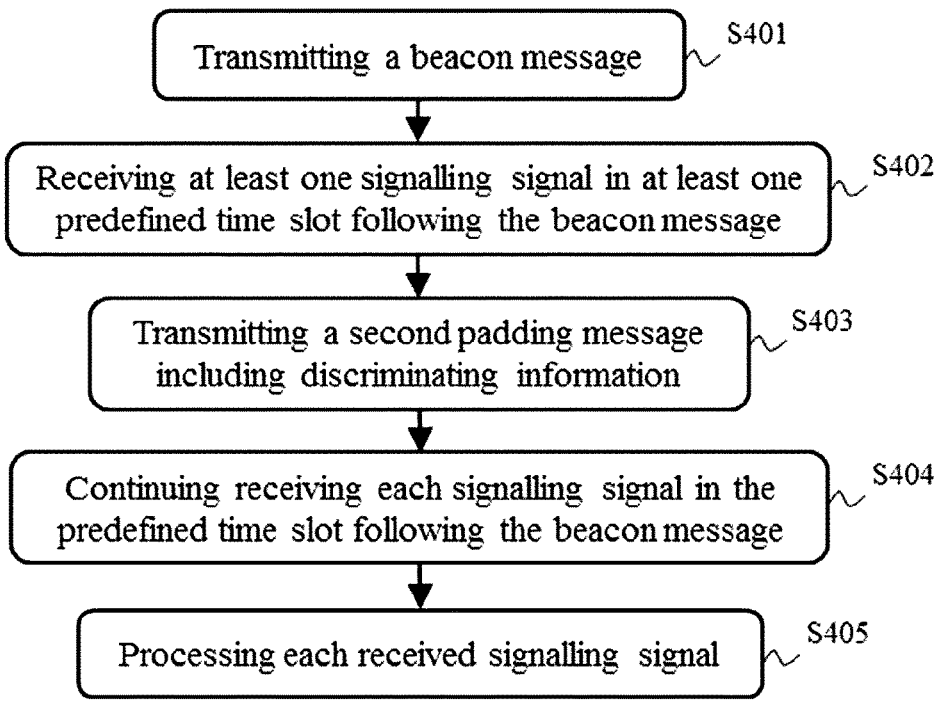

[Fig. 5]
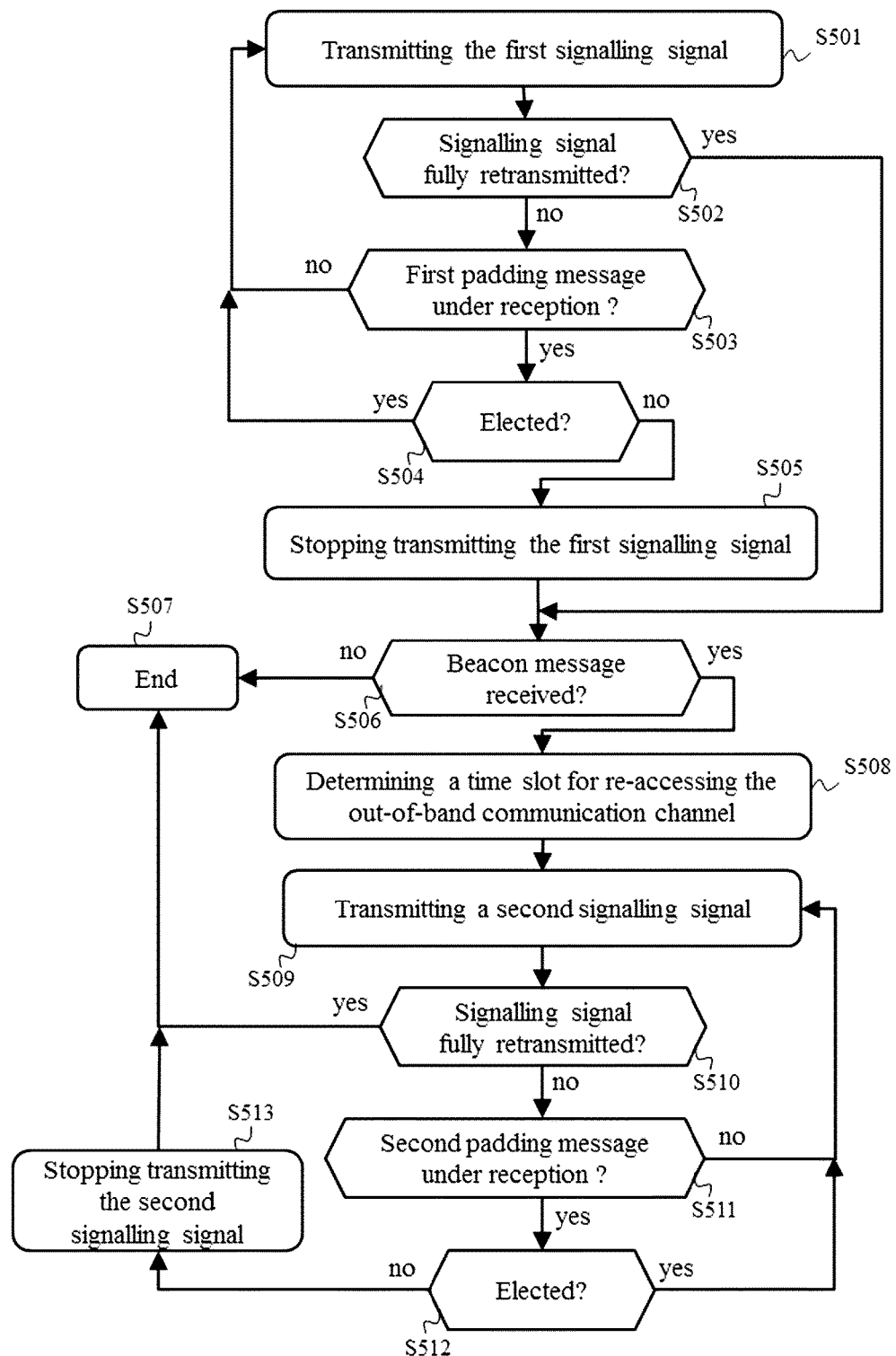

[Fig. 6]
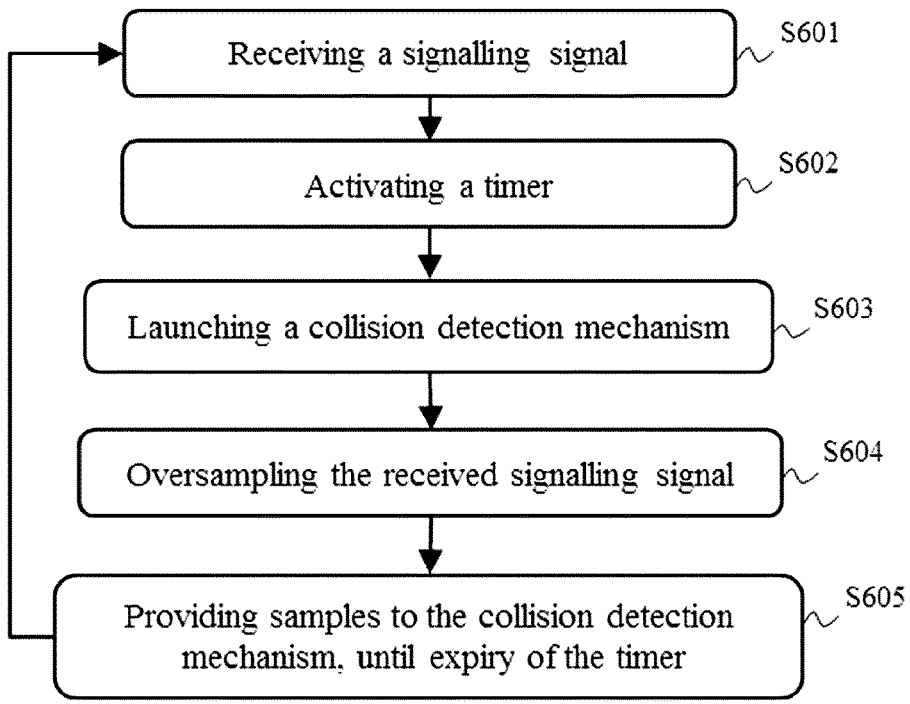
[Fig. 7]
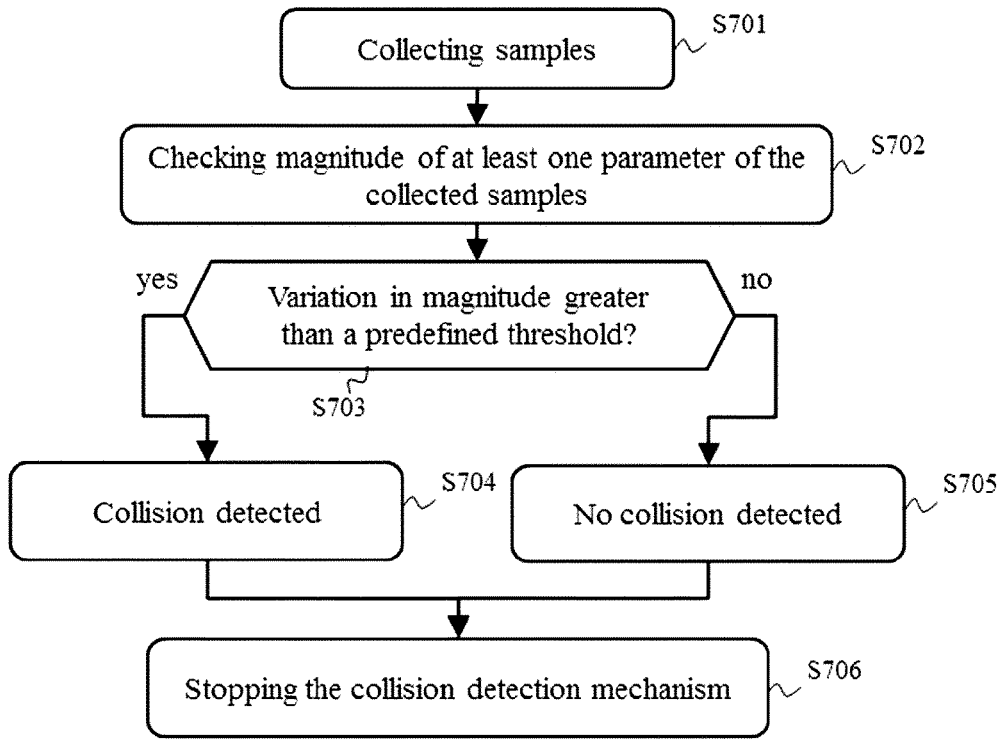

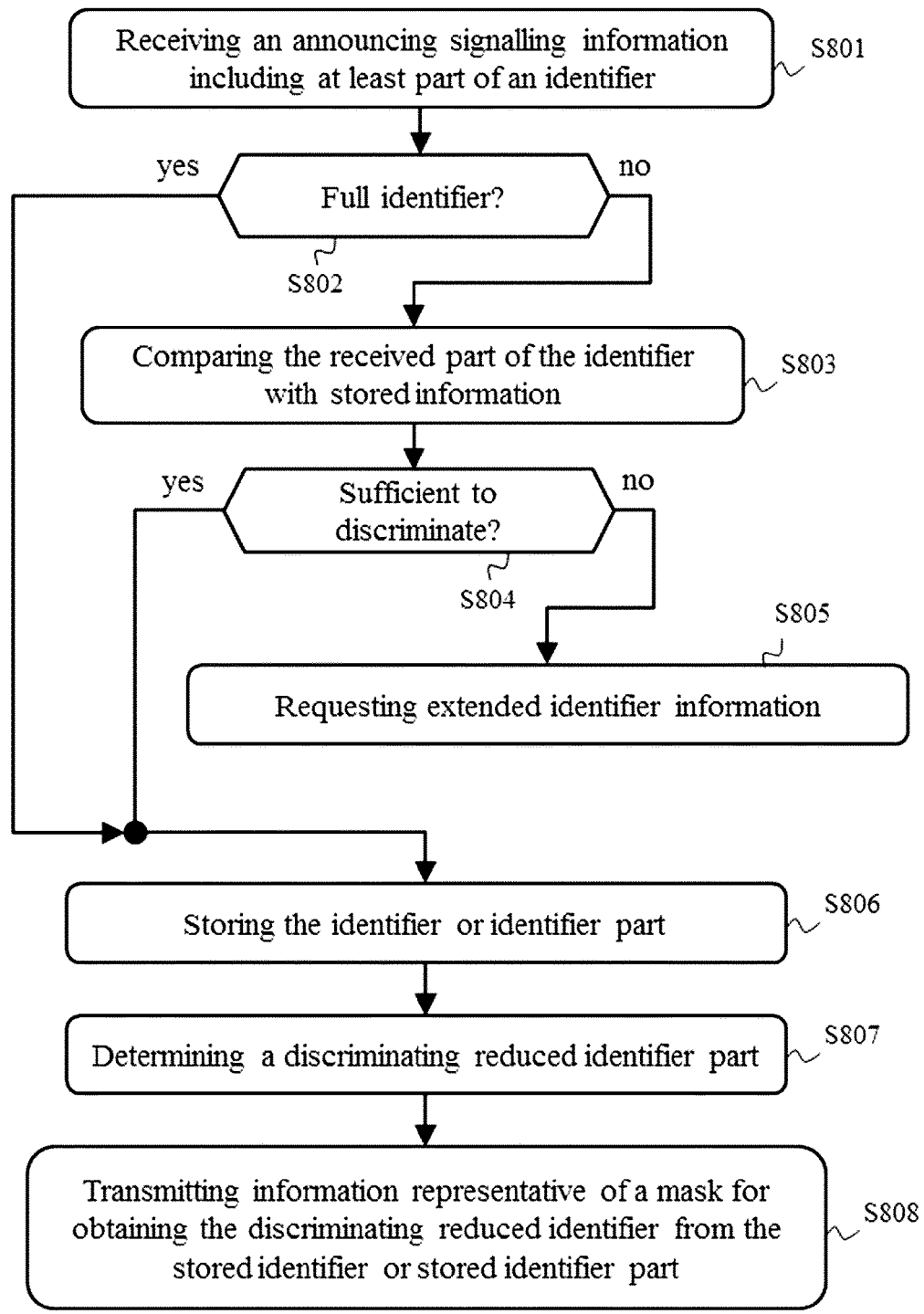

[Fig. 9]
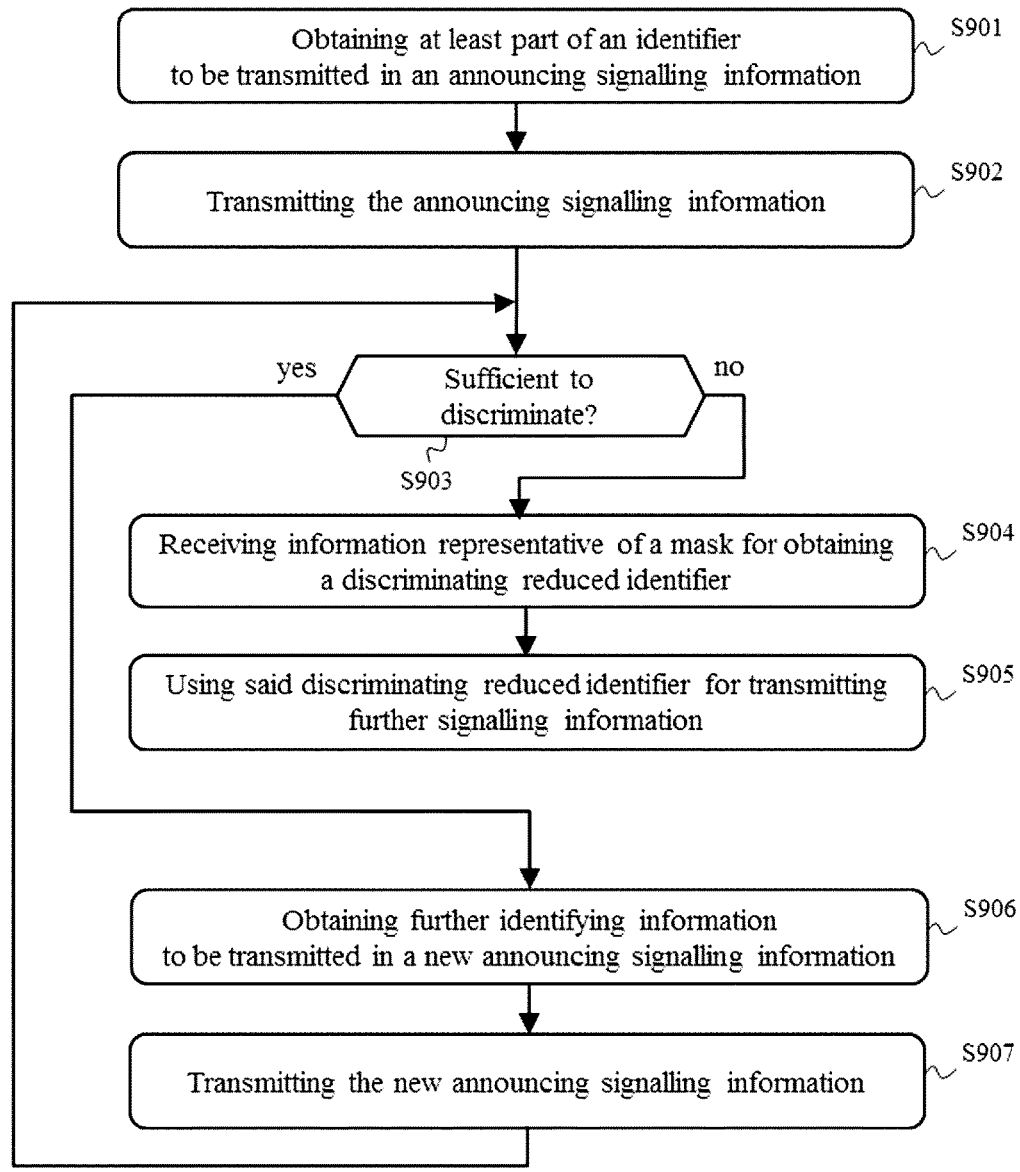

[Fig. 10]
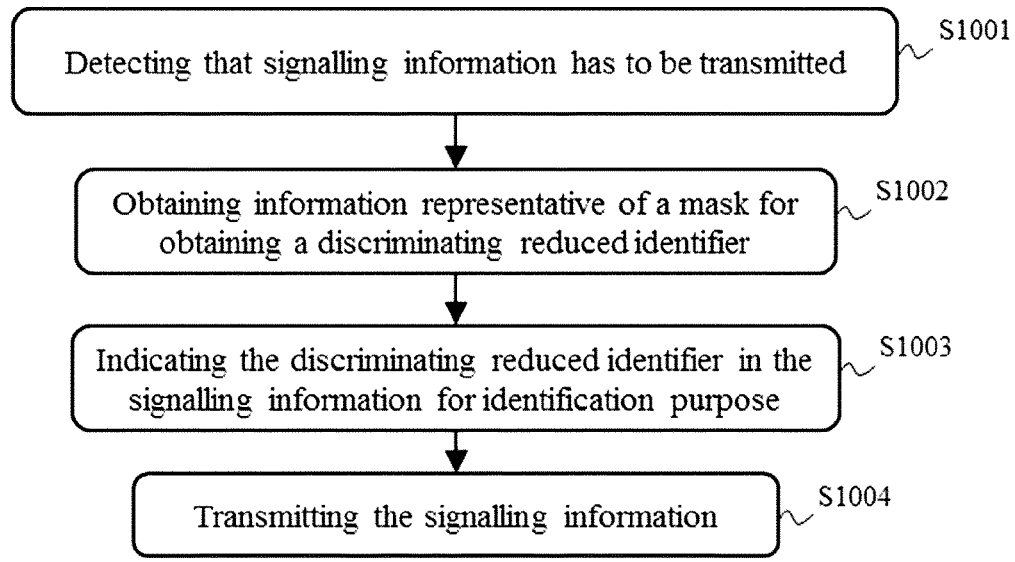
[Fig. 11]
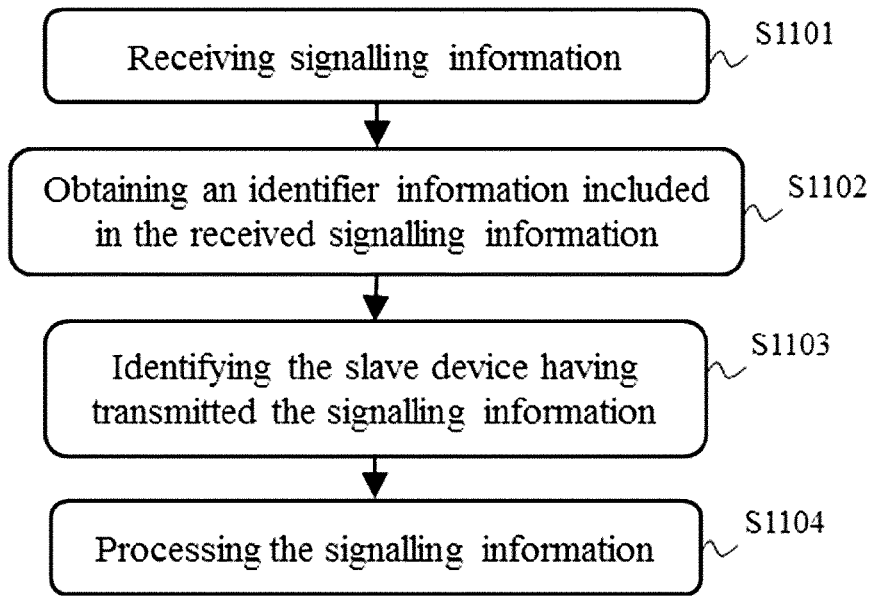

METHOD AND MASTER DEVICE FOR CONTROLLING ACCESS TO OUT-OF-BAND COMMUNICATION CHANNEL IN OPTICAL COMMUNICATIONS NETWORK

TECHNICAL FIELD

The present invention generally relates to optical communications networks and more particularly to controlling access to an out-of-band signalling communication channel.

BACKGROUND ART

Optical communications networks, and more particularly passive optical communications networks, are increasingly used to give network access to residential or office gateways, or data centres, or to ensure mobile backhauling for instance.

In an attempt to increase the number of user terminals to be served by one access system to the network, wavelength (or frequency) division multiplexing technologies have been developed. These technologies take advantage of multiplexing several optical signals using different carrier frequencies on a single optical fiber. Even though some user terminals may share the same carrier frequency, a frequency splitter is typically used to separate different frequencies in use, in order to increase the number of simultaneous optical transmissions. The frequency splitter is typically placed between the user terminals and a set of master terminals providing access to the rest of the network. For instance these master terminals provide access to a metropolitan network or a core network. Different techniques can be used to achieve such frequency splitting. We can cite thin films based systems, interference cavities as AWG (Array Wavelength Gratings) and FBG (Fiber Bragg Gratings) based systems.

The frequency splitter then comprises several optical band-pass filters, for each direction of communication. It is used to filter and combine optical signals issued by the user terminals toward the master terminal to which said user terminals are attached, each user terminal being then supposed to communicate with one master terminal. In the other direction, it is used to filter and spectrally split the optical signals issued by the master terminal toward the user terminals that are attached thereto.

SUMMARY OF INVENTION

Technical Problem

The difficulty in such an arrangement is to configure the transmission interfaces of the terminals. Indeed, these transmission interfaces shall be configured so that the carrier frequencies effectively used are substantially equal to the nominal frequencies of the respective optical band-pass filters via which they communicate. However, the nominal frequencies of the respective optical band-pass filters and/or the carrier frequencies resulting from the effective configuration of the transmission interfaces of the terminals may vary according to environmental conditions, such as temperature. Use of non-temperature controlled environment is usually preferable, as it requires less complexity to operate, especially regarding the user terminals. Since the nominal frequencies of the respective optical band-pass filters may be a priori unknown and/or since the effective configuration of the transmission interfaces of the terminals may be a priori unknown, there is therefore a need to be able to appropriately define the configuration of the transmission interfaces of the terminals in order to lock the carrier frequencies effectively in use with respect to the effective nominal frequencies of the respective optical band-pass filters, for setting up communications between optical communication devices separated by such optical band-pass filters.

Communications within such optical communications networks are typically relying on baseband signals transmitted over an optical carrier frequency and are referred to as in-band communications. The baseband is for instance defined as the range from 1 GHz to 10 GHz. The baseband corresponds to the spectrum range in which are located components resulting from any in-band communication signal which are significant to perform the decoding of the in-band communication signal.

In order to perform the aforementioned frequency locking and in order not to interfere with in-band communications that are established within the optical communications network or in order to prevent any signalling from using the spectrum resource used by the in-band communications, an out-of-band communication channel may be established for allowing implementing a locking protocol or any other signalling protocol. Out-of-band communications between two optical communication devices uses the same carrier frequency than in-band communications between said two optical communication devices. The term out-of-band indicates that the communications occurring within the out-of-band communication channel rely on a spectrum part distinct from the baseband of the in-band communications, typically much lower in terms of frequency than the baseband lower limit, which means that the baud rate in the out-of-band communication channel is much lower than the baud rate in the baseband. Regarding frequency locking, a possible approach is that an initiating device among first and second optical communication devices transmits via the out-of-band communication channel a locking signal to the other optical communication device among the first and second optical communication devices, by using a given carrier frequency. The initiating device performs so by scanning various frequencies until matching the nominal frequency of the concerned optical band-pass filter.

Such an out-of-band communication channel may be established for providing other types of signalling information. However, when two user terminals use the same carrier frequency to access the out-of-band communication channel toward the master terminal to which said terminals are attached, collisions may occur since said user terminals are not able to sense the medium before transmitting signals (contrary to most radiofrequency or wired systems), which may render difficult (even though potentially not impossible) signal decoding at the master terminal's end. Time Division Multiple Access (TDMA) techniques are often used to limit or even avoid such collisions. However, such TDMA techniques introduce undesirable transmission latency, especially when the communication channel provides a low baud rate.

Solution to Problem

It is desirable to overcome the aforementioned problems, which occur in optical communications networks. In particular, it is desirable to provide a solution that allows managing control of access to the out-of-band communication channel in such a way that occurrences of signal collisions are limited while avoiding undesirable transmission latency.

It is furthermore desirable to provide a cost-effective solution to the aforementioned problems.

The present invention also concerns a method for controlling access to an out-of-band communication channel in an optical communications network comprising a master device and slave devices connected to the master device via optical fiber, the optical communications network being adapted to enable in-band communications, the out-of-band communication channel being intended to enable transmissions of signalling signals with respect to the in-band communications, collisions occurring in the out-of-band communication channel when plural slave devices access the out-of-band communication channel by using respective carrier wavelengths that match each other. The method is such that the master device performs: processing signalling signals transmitted by said slave devices without access restriction to the out-of-band communication channel; and upon detecting a collision between signalling signals transmitted by slave devices concurrently accessing the out-of-band communication channel: initiating a temporary time-slotted access to the out-of-band communication channel, so as to restrict access to the out-of-band communication channel, using a predetermined rule of time slot distribution among slave devices likely to concurrently access the out-of-band communication channel using carrier wavelengths substantially identical as those having involved the detected collision. Thus, by implementing temporary such a time-slotted access to the out-of-band communication channel, occurrences of collisions via the out-of-band communication channel are limited.

According to a particular feature, upon receiving a signalling signal out of said temporary time-slotted access and prior to any collision occurrence with said signalling signal, the master device transmits a first so-called padding message representative of the fact that said signalling signal is under reception, towards the slave devices likely to concurrently access the out-of-band communication channel using carrier wavelengths substantially identical as the one of said signalling signal. Thus, the slave devices likely to concurrently access the out-of-band communication channel with respect to the slave device transmitting said signalling signal are informed that said signalling signal is under reception, and can thus perform proactive actions such as delaying a scheduled transmission of signalling information via the out-of-band communication channel.

According to a particular feature, the first padding message contains first discriminating information attempting to distinguish the slave device transmitting the signalling signal that was already under reception when the collision occurred, if any, from another slave device transmitting the signalling signal that would generate the collision. Thus, the first padding message allows determining which slave device transmits the signalling signal under reception and should continue transmitting said signalling signal, and further allows determining which other slave device(s) that may imply collision should stop transmitting, or should not transmit, signalling signal(s).

According to a particular feature, each signalling signal containing identifying information aiming at identifying the slave device transmitting said signalling signal, the master device attempts decoding symbols of the signalling signal under reception, and the master device forms the first padding message so as to include therein symbols successfully decoded from said signalling signal thus forming said first discriminating information. Thus, said first padding message is easy to form.

According to a particular feature, upon detecting said collision, the master device transmits a so-called beacon message representative of said collision, towards the slave devices likely to concurrently access the out-of-band communication channel using carrier wavelengths substantially identical as the ones of the signalling signals having generated said collision, the beacon message informing said slave devices about the instant at which starts the time-slotted access to the out-of-band communication channel. Thus, the slave devices are easily informed about how the time-slotted access is setup and when normal asynchronous transmissions (non time-slotted) can resume.

According to a particular feature, the beacon message includes, for each time slot, second discriminating information representative of each slave device that is allowed to transmit a signalling signal within said time slot. Thus, occurrences of collisions are further limited.

According to a particular feature, said second discriminating information is a subset of identifier bits with respective bits positions in said identifier such that the slave devices that are identified by an identifier comprising said subset of bits at said positions are allowed to access the out-of-band communication channel within said time slot. Thus, occurrences of collisions are further limited, even though plural slave devices may have respective identifiers matching the condition for accessing the out-of-band communication channel within the concerned time slot.

According to a particular feature, the beacon message further requests, for each time slot, that complementary identifier bits be included in the signalling signal to be transmitted within said time slot. Thus, in case the master device was not able to previously identify which slave devices has implied the collision, the complementary identifier bits would help in refining the candidate slave devices.

According to a particular feature, upon receiving a signalling signal within one time slot of said temporary time-slotted access and prior to any collision occurrence with said signalling signal, the master device transmits a second so-called padding message representative of the fact that said signalling signal is under reception, towards the slave devices likely to concurrently access the out-of-band communication channel using carrier wavelengths substantially identical as the one of said signalling signal. Thus, the slave devices likely to concurrently access the out-of-band communication channel with respect to the slave device transmitting said signalling signal are informed that said signalling signal is under reception within the concerned time slot, and can thus perform proactive actions such as delaying a scheduled transmission of signalling information within said time slot.

According to a particular feature, the second padding message contains third discriminating information attempting to distinguish the slave device transmitting the signalling signal that was already under reception within said time slot when the collision occurred, if any, from another slave device transmitting the signalling signal that would generate the collision. Thus, the second padding message allows determining which slave device transmits the signalling signal under reception within said time slot and should continue transmitting said signalling signal, and further allows determining which other slave device(s) that may imply collision should stop transmitting, or should not start transmitting, signalling signal(s).

According to a particular feature, each signalling signal containing identifying information aiming at identifying the slave device transmitting said signalling signal, the master device attempts decoding symbols of the signalling signal under reception within said time slot, and the master device forms the second padding message so as to include therein symbols successfully decoded from said signalling signal thus forming said third discriminating information. Thus, said second padding message is easy to form.

According to a particular feature, said third discriminating information is representative of a round-trip time between the master device and the slave device transmitting the signalling signal that was already under reception within said time slot when the collision occurred, if any.

According to a particular feature, said third discriminating information is representative of a Received Signal Strength Indication measured by the master device from the signalling signal that was already under reception within said time slot when the collision occurred, if any.

According to a particular feature, the signalling information being in the form of modulation symbols over successive symbol periods, the master device performs, for detecting collisions in the out-of-band communication channel: receiving a signal via the out-of-band communication channel; oversampling the received signal starting from an instant of reception of said signal, so as to obtain samples thereof, by using a frequency that corresponds to a sampling frequency used for the in-band communications, or to a submultiple derived therefrom, such that the quantity of samples thus obtained per symbol period is enough high to consider that noise over the out-of-band communication channel is self-compensated over said quantity of samples; checking variations of magnitude of at least one parameter of the samples on a per symbol period basis, each said parameter being one parameter among amplitude, phase, and frequency and being chosen for checking said variations according to the modulation that was applied on said signal for transmission via the out-of-band communication channel; and detecting a collision when the variations of each said parameter are greater than a predefined threshold equal to or greater than noise variance over the out-of-band communication channel regarding said parameter. Thus, collision is easily detected and in a cost-effective manner.

According to a particular feature, the master device performs: receiving, via the out-of-band communication channel, a so-called announcing signalling information; and transmitting, in response to said announcing signalling information, information representative at least of said mask. Thus, a slave device joining the optical communications network can rapidly use the reduced identifying information, and can rapidly reduce the risk of collision with other signalling information transmitted by slave device likely to concurrently access the out-of-band communication channel.

According to a particular feature, the master device provides to the slave devices a translation table providing association of vendors identifier part with codes having a shorter size defined according to the quantity of the different vendors by which the slave devices present in the passive optical communications network have been manufactured, so that said slave devices replaces, in the signalling information as transmitted, the vendor identifier parts of their respective identifiers by the corresponding codes as indicated in said table. Thus, the size of the identifying information effectively used in the signalling information to identify the slave device transmitting said signalling information is further reduced.

According to a particular feature, an optical transmission interface of said slave device has to be adjusted for transmitting optical signals to the master device via an optical band-pass filter, the master device having an optical reception interface configured to enable receiving optical signals output by said optical band-pass filter and transmitted by said slave device on a carrier wavelength when said carrier wavelength is comprised in the passband of the optical band-pass filter, said carrier wavelength being a priori unknown and/or said passband of the optical band-pass filter being a priori unknown, and wherein said signalling information is used to lock said carrier wavelength with respect to said passband of the optical band-pass filter. Thus, since locking carrier wavelengths is resource consuming over the out-of-band communication channel, the risk of collisions via the out-of-band communication channel is particularly reduced in such a context, which therefore improves the locking mechanism, at least in terms of system reactivity.

The present invention also concerns a master device for controlling access to an out-of-band communication channel in an optical communications network comprising the master device and slave devices connected to the master device via optical fiber, the optical communications network being adapted to enable in-band communications, the out-of-band communication channel being intended to enable transmissions of signalling signals with respect to the in-band communications, collisions occurring in the out-of-band communication channel when plural slave devices access the out-of-band communication channel by using respective carrier wavelengths that match each other. The master device is such that said master device implements: a processor to process signalling signals transmitted by said slave devices without access restriction to the out-of-band communication channel; and upon to detect a collision between signalling signals transmitted by slave devices concurrently accessing the out-of-band communication channel: initiator to initiate a temporary time-slotted access to the out-of-band communication channel, so as to restrict access to the out-of-band communication channel, using a predetermined rule of time slot distribution among slave devices likely to concurrently access the out-of-band communication channel using carrier wavelengths substantially identical as those having involved the detected collision.

The present invention also concerns a computer program that can be downloaded from a communications network and/or stored on a medium that can be read by a computer and run by a processor. This computer program comprises instructions for implementing the aforementioned methods in any one of their various embodiments, when said program is run by the processor. The present invention also concerns information storage means, storing a computer program comprising a set of instructions for implementing the aforementioned methods in any one of their various embodiments, when the stored instructions are read by a computer and run by a processor.

The characteristics of the invention will emerge more clearly from a reading of the following description of an example of embodiment, said description being produced with reference to the accompanying drawings.

BRIEF DESCRIPTION OF DRAWINGS

FIG. 1 schematically represents an arrangement of an optical communications network, including a master device and a plurality of slave devices, in which the present invention may be implemented.

FIG. 2 schematically represents an arrangement of the master device of the optical communications network.

FIG. 3 schematically represents an algorithm, performed by the master device, for processing signalling signals received via the out-of-band communication channel.

FIG. 4 schematically represents an algorithm, performed by the master device, for initiating a collision avoidance procedure.

FIG. 5 schematically represents an algorithm, performed by each slave device, for transmitting signalling signals to the master device via the out-of-band communication channel.

FIG. 6 schematically represents an algorithm, performed by the master device, for initiating a collision detection mechanism for detecting collisions of signalling signals transmitted by respective slave devices via the out-of-band communication channel.

FIG. 7 schematically represents an algorithm, performed by the master device, for implementing the collision detection mechanism.

FIG. 8 schematically represents an algorithm, performed by the master device, for processing announcing signalling information received via the out-of-band communication channel, according to one embodiment of the present invention.

FIG. 9 schematically represents an algorithm, performed by each slave device, for transmitting announcing signalling information via the out-of-band communication channel, according to the embodiment of the present invention introduced with regard to FIG. 8.

FIG. 10 schematically represents an algorithm, performed by each slave device, for transmitting further signalling information via the out-of-band communication channel, according to one embodiment of the present invention.

FIG. 11 schematically represents an algorithm, performed by the master device, for processing said further signalling information received via the out-of-band communication channel, according to the embodiment of the present invention introduced with regard to FIG. 10.

DESCRIPTION OF EMBODIMENTS

In order to efficiently manage access to an out-of-band communication channel in an optical communications network comprising a master device and a plurality of slave devices as detailed hereinafter, it is proposed, according to a first aspect, that signalling signals are mainly asynchronously transmitted via the out-of-band communication channel, with no time-slotted access. It means that slave devices access the out-of-band communication channel without access restrictions, i.e. when they want. It can be noticed that, even though a same event that is detected simultaneously by two slave devices might activate respective—thus somehow synchronous—transmissions of signalling signals, the signalling signals are typically asynchronously received by the master device due to different propagation distances inducing different latencies throughout the optical communications network. Plural signalling signals may however occasionally be concurrently received, thus generating a collision. When such a collision is detected, the master device initiates a temporary time-slotted access to the out-of-band communication channel so as to restrict access to the out-of-band communication channel using a predetermined rule of time slot distribution among slave devices likely to concurrently access the out-of-band communication channel using carrier wavelengths substantially identical as those having involved said collision, in order to avoid, or at least limit, occurrences of such collisions of concurrent signalling signals relying on said carrier wavelengths.

According to a second aspect, upon receiving signalling signals prior to any collision occurrence with said signalling signals, the master device transmits padding messages representative of the fact that said signalling signals are under reception, towards the slave devices likely to concurrently access the out-of-band communication channel using carrier wavelengths substantially identical as the ones of said signalling signals. Such padding messages are therefore intended to inform the slave devices that said signalling signals are under reception so that other slave devices avoids accessing the out-of-band communication channel. Such padding messages preferably contain discriminating information attempting to distinguish the slave devices respectively transmitting the signalling signals that was already under reception when the collision occurred, if any, from another slave device transmitting a signalling signal that would generate the collision. Such padding messages are therefore intended to inform the slave devices that said signalling signals are under reception so that other slave devices, not elected according to said discriminating information, stops accessing the out-of-band communication channel. It can be noted that said second aspect can be implemented independently of said first aspect, but preferably in conjunction of said first aspect (as detailed hereafter).

FIG. 1 schematically represents an arrangement of a passive optical network in which the present invention may be implemented.

It has to be noticed that, since wavelength and frequency are tied together through a direct inverse relationship, these two terms are indifferently used by the one skilled in the art, as they refer to the same concept.

The description hereafter is detailed in the context of a passive optical communications network, but can be similarly applied in the more general context of optical communications networks.

The passive optical communications network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical communications network 100 are performed by using optical fiber. A particular hardware-platform embodiment for implementing the master device 110 and the slave devices 141, 142, 143 is detailed hereafter with regard to FIG. 2.

In the context of the passive optical communications network 100, the slave devices 141, 142, 143 are of ONU (Optical Network Units) type. ONUs are typically intended to be located at the end-user households or at remote radio heads for fronthauling applications.

In the context of the passive optical communications network 100, the master device 110 is of OLT (Optical Line Terminal) type. It enables ONUs to access a metropolitan or a core network (not shown).

The slave devices 141, 142, 143 may be connected to the spectral splitter device 120 via a power splitter device 132. The power splitter device 132 is a passive splitter that separates the input signal, in the downlink direction (from the master device 110 toward the slave devices), into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the master device to which said slave devices are attached. The PONs operate on respective wavelength bands, as filtered by the spectral splitter device 120. To achieve this, the spectral splitter device 120 comprises a pair of optical band-pass sets of filters for each PON, aiming at filtering respective wavelength bands, and thus enabling the spectral splitter device 120 to perform Wavelength Division Multiplexing.

Therefore, as shown on FIG. 1, the spectral splitter device 120 comprises sets 121, 122 of optical band-pass filters dedicated to the transmissions over the PON of the power splitter device 132 and its associated slave devices 141, 142, 143. The set of filters 122, called hereinafter uplink filters, is in charge of filtering the optical signals in the uplink direction (from the slave devices 141, 142, 143 to the master device 110, which are in the same PON). The set of filters 121, called hereinafter downlink filters, is in charge of filtering the optical signals in the downlink direction. Each filter of the sets 121, 122 is a band-pass filter defined by a nominal wavelength, also referred to as centre wavelength, as well as a bandwidth. Each filter of the sets 121, 122 may also be defined by a spectral shape.

For a considered uplink or downlink direction, all the filters of the spectral splitter device 120 have preferably the same bandwidth value and are preferably spaced by a fixed spectral distance. However, the nominal wavelengths of the filters are a priori unknown. The spectral splitter device 120 being preferably passive, the nominal wavelengths of the filters may vary as a function of the temperature of the spectral splitter device 120 (heat generated by the spectral splitter device 120 or by equipment located nearby, or environmental conditions).

It has to be noticed that, the band-pass filters being designed upon the same constraints, the bandwidth value of the filters and the spectral distance between the filters are substantially independent of the temperature variations.

In addition, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier wavelengths that are substantially equal to the nominal frequency of the concerned uplink filter of the set 122. In addition, the master device 110 needs to be configured for transmitting optical signals in the downlink direction on a carrier wavelength that is substantially equal to the nominal frequency of the concerned downlink filter of the set 121. In other words, carrier frequencies need to be locked and an out-of-band communications channel is implemented for doing so, as detailed hereinafter. Said out-of-band communication channel may further be used to transmit other signalling information. More particularly, the out-of-band communication channel is intended to enable transmissions of signalling information with respect to the in-band communications in the form of modulation symbols over successive symbol periods. Such signalling information may for instance include class of service or data rate information related to the in-band communications traffic from said slave device toward the master device, or any other information known by said slave device and useful for the master device 110 for enabling management of the in-band communications. Such signalling information may also include operational information, such as battery remaining load, environmental temperature, when the concerned slave device is equipped with adapted sensors, or any other information known by said slave device and useful for the master device 110 for enabling operational management of the passive optical communications network 100.

It can be noticed that a wavelength in the passband of a given filter is considered as substantially equal to the nominal frequency of said given filter.

It can be noted that the nominal wavelengths of filters of the sets 121, 122 may be identical. It means that either a same carrier wavelength or different carrier wavelengths can be used in the downlink and uplink directions.

In order to allow locking the carrier frequency between one slave device, such as the slave device 141, and the master device 110, an approach is that the slave device transmits a locking signal via the out-of-band communication channel. This locking signal is transmitted over a carrier frequency selected, e.g. arbitrarily, by said slave device. When the out-of-band communication channel is already setup from the master device 110 to said slave device, the master device 110 can transmit an out-of-band message to the slave device when the locking signal is received by the master device 110 (when the carrier frequency used for the locking signal matches the nominal frequency of the concerned uplink filter of the set 122). When no such out-of-band message is received by said slave device within a predefined time period following the transmission of the locking signal, said slave device reiterates the process with another carrier frequency, and so on until having used a carrier frequency that matches the nominal frequency of the concerned uplink filter of the set 122. When an in-band communication is already setup from the master device 110 to said slave device, the master device 110 may use instead an in-band message to respond to the locking signal. Other approaches can be implemented in order to lock the carrier frequency effectively in use by said slave device so as to match the nominal frequency of the concerned uplink filter of the set 122. For instance, locking the carrier frequency can be achieved in the uplink direction using a mirror-based approach described in patent application EP 2466768 A1.

In order to avoid generating interferences with in-band communications already setup in the optical communications network 100, for instance from the slave device 142 to the master device 110, it is proposed to generate a particularly shaped locking signal. Any receiver device of the optical communications network 100, such as the master device 110, is thus able to distinguish the locking signal from signals of an already-setup in-band communication and to continue decoding the signals exchanged within said already-setup in-band communication. The locking signal is a modulated signal obtained from information to be transmitted to the master device 110. In a particular embodiment, the modulation is for instance performed by a circular function which frequency $\Omega$ is lower than the baud rate of the in-band communications. In other words, the frequency $\Omega$ is lower than the lower limit of the baseband, wherein it is recalled that the baseband corresponds to a range of frequencies that have to be filtered to decode the in-band communication signals. In a preferred embodiment, the frequency $\Omega$ is significantly lower than the lower limit of the baseband. For instance, the frequency $\Omega$ equals 1 MHz and the lower limit of the baseband is 1 GHz (or up to 10 GHz). Amplitude modulation techniques are then used to provide signalling information via the locking signal. The locking signal may be, in a variant, modulated using Amplitude Shift Keying (ASK) modulation or Frequency Shift Keying (FSK) modulation or Phase Shift Keying (PSK) modulation, or any kind of modulation derived therefrom, such as a modulation of differential type (Differential Frequency Shift Keying, . . . ). In a preferred embodiment, said slave device apodizes the modulated signal, i.e. removes or smoothes sharp discontinuities in the modulated signal. Said slave device thus ensures that the apodized modulated locking signal smoothly tends toward zero at the beginning and at the end of the signal so that no transient frequencies in the baseband are generated in the locking signal. Embodiments for generating out-of-band communication signals and discriminating said out-of-band communication signals from in-band communication signals are disclosed in the European patent application published under the reference EP 2 621 112 A1.

As already mentioned, the out-of-band communication channel may be used for transmitting other signalling information than in the scope of the carrier frequency locking process. Said signalling information is transmitted via the out-of-band communication channel with the same signal shape as the aforementioned locking signal. Signalling information can thus be coded by relying on the modulation used to form the out-of-band signal. Signalling information is preferred compared with other types of information, since the baud rate achievable via the out-of-band communication channel is, by definition, far lower than the baud rate achievable via the in-band communication channel, and therefore information transmitted via the out-of-band communication channel is expected to be limited in terms of size, in order to limit occurrences of collisions and to ease sharing access to the out-of-band communication channel between the slave devices. Collisions occur in the out-of-band communication channel when plural slave devices access the out-of-band communication channel by using respective carrier wavelengths that match each other. Said carrier wavelengths match each other when the carrier wavelengths are within the same detection channel from the standpoint of the master device 110 (carrier wavelengths detected by the master device 110 as crossing the same uplink filter of the set 122).

It can be noted that such collisions occur also in the scope of PON-only optical networks, since in that case the slave devices communicate with the master device within the same detection channel from the standpoint of the master device 110 (since, in the scope of FIG. 1, the spectral splitter device 120 aims at creating plural independent detection channels usable by distinct masters devices).

An algorithm performed by the master device 110 for processing signalling signals received via the out-of-band communication channel is detailed hereafter with regard to FIG. 3 and an algorithm performed by each slave device 141, 142, 143 for transmitting said signalling signals via the out-of-band communication channel is detailed hereafter with regard to FIG. 5.

It is considered herein that the out-of-band communication channel is already setup in the downlink direction, from the master device 110 to the slave device transmitting the signalling signal, prior to transmitting and processing said signalling signal, in order to perform transmissions in response thereof, as discussed hereinafter. For instance, said out-of-band communication channel already setup in the downlink direction is setup using the mirror-based approach described in patent application EP 2466768 A1. Since the carrier frequency used by the master device 110 for transmitting signals to said slave device via the out-of-band communication channel (i.e. in the downlink direction) is the same as the carrier frequency used for transmitting in-band communication signals to said slave device, it may be considered, instead or in addition, that in-band communications are already setup from the master device 110 to the slave device (i.e. in the downlink direction) to allow said transmissions in response to said signalling signal.

FIG. 2 schematically represents an arrangement of the master device 110. According to the shown arrangement, the master device 110 comprises the following components interconnected by a communications bus 210: a processor, microprocessor, microcontroller or CPU (Central Processing Unit) 200; a RAM (Random-Access Memory) 201; a ROM (Read-Only Memory) 202; a device 203 adapted to read information stored on storage means; a first communication interface 204, aiming at being connected to the spectral splitter device 120 for transmitting and receiving optical signals; and, a second communication interface 205, aiming at being connected to the metropolitan or core network.

CPU 200 is capable of executing instructions loaded into RAM 201 from ROM 202 or from any other storage means. After the master device 110 has been powered on, CPU 200 is capable of reading instructions from RAM 201 and executing these instructions. The instructions form one computer program that causes CPU 200 to perform some or all of the steps of the algorithms described hereafter with regard to FIGS. 3, 4, 6, 7, 8 and 11.

It can be noted that the slave devices 141, 142, 143 may also be implemented on the basis of the arrangement schematically shown in FIG. 2. In this case, the first communication interface 204 allows communicating with the master device 110, potentially through the spectral splitter device 120, and the second communication interface 205 allows connecting the considered slave device 141, 142, 143 to a local area network, such as a home network. In this case, the instructions form one computer program that causes CPU 200 to perform some or all of the steps of the algorithms described hereafter with regard to FIGS. 5, 9 and 10.

Any and all steps of the algorithms described hereafter with regard to FIGS. 3 to 11 may be implemented in software by execution of a set of instructions or program by a programmable computing machine, such as a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm, performed by the master device 110, for processing signalling signals received via the out-of-band communication channel.

In a step S301, the master device 110 receives at least one signalling signal via the out-of-band communication channel. Such signalling signals are asynchronously transmitted via the out-of-band communication channel, which means that plural signalling signals may be concurrently received by the master device 110. As the probability that the master device 110 starts receiving signalling signals from two or more respective slave devices exactly at the same instant is rather low, the master device 110 typically starts receiving a first signalling signal from a first slave device and may potentially start receiving a second signalling signal from a second slave device while the first signalling signal is still under reception, wherein the first and second slave devices use respective carrier frequencies matching each other. When the master device 110 starts receiving the second signalling signal, a collision occurs with the first signalling signal. It has to be noticed that collisions between more than two signalling signals may also occur.

When receiving a signalling signal via the out-of-band communication channel, the master device 110 attempts decoding an already received part of the signalling signal without waiting for having fully received the signalling signal. When a collision occurs, and despite said collision, the master device 110 preferably continues attempting decoding the signalling signal that was under reception when the collision occurred. This might help obtaining from said signalling signal discriminating information allowing to distinguish the slave device transmitting the signalling signal that was already under reception when the collision occurred from the slave device transmitting the signalling signal that generated the collision, especially when a first padding message as detailed hereafter is transmitted.

Thus, in a step S302, when the master device 110 starts receiving the signalling signal prior to occurrence of any collision with said signalling signal, the master device 110 preferably transmits a first padding message. The first padding message intends to limit collisions. Indeed, the first padding message prevents other slave devices from starting transmitting signalling signals as far as the first padding message is being received by said slave devices, and further as far as the upcoming time-slotted access (see details hereafter) to the out-of-band communication channel ends, plus possibly a guard interval of predefined duration. Moreover, when a slave device that is currently transmitting a signalling signal receives such a first padding message (as detailed hereafter with regard to FIG. 5), said slave device checks whether said slave device is elected for continuing transmitting a signalling signal via the out-of-band communication channel or whether said slave device is expected to stop transmitting the signalling signal and to reiterate the transmission of the signalling signal or an equivalent signalling signal later on. When said slave device recognizes that said slave device is not elected for continuing transmitting the signalling signal via the out-of-band communication channel, said slave device stops transmitting the signalling signal, which has the effect of stopping a collision occurring at the master device's end. Transmitting the first padding message is therefore a preventive measure, since the first padding message aims at being transmitted prior to any collision occurrence regarding the signalling signal that triggered the transmission of the first padding message.

The first padding message preferably contains first discriminating information attempting to distinguish the slave device transmitting the signalling signal that was already under reception when the collision occurred, if any, from another slave device transmitting a signalling signal that would generate the collision. The first padding message contains first discriminating information attempting to distinguish the slave device transmitting via the out-of-band communication channel the signalling signal that is originally detected by the master device 110. The first discriminating information is at least part of an identifier of the slave device transmitting said signalling signal. More particularly, the signalling signal containing bits of the identifier of the slave device transmitting said signalling signal, the master device 110 forms the first padding message by repeating on a bit by bit basis said signalling signal. The transmission of the first padding message can therefore start before the end of the reception of the signalling signal. The master device 110 therefore attempts decoding said signalling signal as said signalling signal is received. If a collision occurs, the master device 110 may not be able to decode all bits of said signalling signal, and in this case, the master device 110 replaces, when forming the first padding message, bits that the master device 110 was not able to decode, by a symbol period with no signal. The first padding message may therefore contain not all identifier bits of the slave device transmitting the signalling signal that triggered the transmission of the first padding message, since said all bits may not be contained in said signalling message (see further details hereafter) and since the master device 110 may not be able to decode all bits of the signalling signal. It means that the first discriminating information contained in the first padding message may not allow distinguishing said slave device from any other slave device of the optical communications network, since plural slave device may have respective identifiers having the same bits as the ones decoded by the master device 110 from said signalling signal. It however limits risks of collision occurrences or at least limits risks that such collision remains.

The first padding message is transmitted by the master device 110 via the out-of-band communication channel by using a carrier frequency that is a downlink carrier frequency matching the nominal frequency of the downlink filter of the set 121 paired with the normal frequency of the uplink filter of the set 122 that the carrier frequency used for transmitting said signalling signal matches (since communications between the master device 110 and said slave device occur within a single PON).

In a variant, the first padding message is transmitted by the master device 110 via in-band communications, when said in-band communications are already setup, by using a carrier frequency that is a downlink carrier frequency matching the nominal frequency of the downlink filter of the set 121 paired with the nominal frequency of the uplink filter of the set 122 that the carrier frequency used for transmitting said signalling signal matches (since communications between the master device 110 and said slave device occur within a single PON).

In other words, the master device transmits the first padding message, which is representative of the fact that a signalling signal is under reception, towards the slave devices of its PON, i.e. the slave devices likely to concurrently access the out-of-band communication channel using carrier wavelengths substantially identical as the one of said signalling signal.

Then, in a step S303, the master device 110 checks whether such a collision is detected. An embodiment for detecting collisions based on magnitude variations of at least one parameter of signals received via the out-of-band communication channel is detailed hereafter with regard to FIGS. 6 and 7. In a variant, when the signalling signal uses an M-ary amplitude modulation (M possible states corresponding to different amplitudes), the master device 110 detects collision when the quantity of states detected in a signal received via the out-of-band communication channel over one or more symbols is strictly greater than M. Other techniques may be implemented for collision detection, such as by relying on ability to decode information contained in signals received via the out-of-band communication channel.

When such a collision is detected, a step S304 is performed; otherwise, a step S305 is performed.

In the step S304, the master device 110 initiates a collision avoidance procedure. The collision avoidance procedure is detailed hereafter with regard to FIG. 4. Then, the master device 110 continues attempting decoding the signalling signal that was under reception when the collision occurred and thus performs the step S305. In the embodiment wherein the first padding message is transmitted, the collision is expected to be stopped by the first padding message, hopefully before the end of the reception of the signalling signal that was under reception when the collision started to occur. Due to the collision, it is highly probable that the master device 110 won't be able to fully decode the signalling information transmitted via the signalling signal that was already under reception when the collision occurred, which would necessitate retransmitting said signalling signal, or a complementary signalling signal, in the scope of the collision avoidance procedure detailed hereafter with regard to FIG. 4.

In the step S305, the master device 110 checks whether the reception of the signalling signal, which was under reception when the collision occurred if any, has ended. The signalling signal is expected to have a predefined duration, which corresponds to a predefined quantity of symbol periods over the out-of-band communication channel. When the reception of the signalling signal has ended, the algorithm ends in a step S306; otherwise the step S301 is repeated while the signalling signal continues to be received by the master device 110. When the signalling signal could be fully decoded by the master device 110, then the master device 110 processes information contained in the decoded signalling signal by providing said information to upper layers. Otherwise, the master device 110 waits that the collision avoidance procedure be implemented, in order to allow the concerned slave device to retransmit the signalling signal or transmit a complementary signalling signal, which would then allow the master device 110 to get said information to be further processed by the upper layers.

FIG. 4 schematically represents an algorithm, performed by the master device 110, for initiating a collision avoidance procedure.

In a step S401, the master device 110 transmits a beacon message representative of the collision that has been detected in the step S303. The beacon message is representative that a time-slotted access to the out-of-band communication channel has to be temporarily set up to attempt overcoming collision issues. The time-slotted access to the out-of-band communication channel is temporarily set up during a predetermined duration T. The master device 110 transmits the beacon message in the out-of-band communication channel (in the downlink direction). The master device 110 may in a variant transmit the beacon message in the in-band communication channel, when in-band communications with the slave devices supposed to have concurrently accessed the out-of-band communication channel in the uplink direction are already setup. The beacon message is transmitted by the master device 110 by using a carrier frequency that is a downlink carrier frequency matching the nominal frequency of the downlink filter of the set 121 paired with the nominal frequency of the uplink filter of the set 122 that the carrier frequencies used for transmitting the signalling signals (which have generated the collision) match (since they act within the same PON). It means that the beacon message is intended to be received by all slave devices of the considered PON. The beacon message is therefore intended to be received by the slave devices that created the collision, among potentially other slave devices, and by any other slave device that uses substantially the same carrier wavelength, i.e. involving a signalling signal transmission that goes through the same uplink filter of the set 122.

The beacon message implicitly or explicitly informs the slave devices about the instant at which starts the time-slotted access to the out-of-band communication channel. The beacon message implicitly or explicitly refers to a time period T0 between the reception of the beacon message by a slave device and the instant at which said slave device shall consider that the time-slotted access to the out-of-band communication channel starts. This instant at which starts the time-slotted access to the out-of-band communication channel is therefore not absolute in practice, since the propagation latency from the master device 110 to a slave device depends on the length of the path via the optical communications network from the master device 110 to said slave device. Each time slot therefore includes a guard interval equal to half the maximum Round Trip Time (RTT) in the optical communications network, in order to cope with the absence of common time reference in the optical communications network.

According to one embodiment, each time slot has a duration that is dynamically determined by the master device 110, as a function of the quantity of signalling information bits that the master device 110 expects receiving from the concerned slave device within said time slot.

According to another embodiment, each time slot has a predefined duration that is equal or greater than the predefined duration of any signalling signal that may be transmitted by any slave device via the out-of-band communication channel. From the standpoint of any slave device, purely asynchronous transmissions from said slave device via the out-of-band communication channel can resume once a time period equal to T+T0 has lapsed since the reception of the beacon message by said slave device.

According to yet another embodiment, each time slot has a predetermined duration that is equal or greater than the predefined duration of any signalling signal that may be transmitted by any slave device via the out-of-band communication channel. The duration of each time slot is then described in the beacon message. From the standpoint of any slave device, purely asynchronous transmissions from said slave device via the out-of-band communication channel can resume once a time period P has lapsed since the reception of the beacon message by said slave device, wherein the duration of the time period P equals to:

$$T+\Sigma_i T_i$$

wherein $T_i$ represents the duration of the time slot identified by the index i varying from 1 to N, where N represents the quantity of time slots, as indicated in the beacon message.

The beacon message implicitly or explicitly informs the slave devices about the quantity N of time slots defining the time-slotted access to the out-of-band communication channel. The master device 110 may adjust the quantity of such time slots according to the quantity of signalling signals that have created the collision detected in the step S303. For instance, when two signalling signals generates a collision, two time slots are defined. Access to the out-of-band communication channel by the concerned slave devices during such time slots is detailed hereafter with regard to FIG. 5.

According to a first embodiment of the beacon message, the distribution of the time slots among the slave devices is predefined according to a set of rules. In this case, each slave device knows said set of rules and knows therefrom, according to the quantity of time slots, within which time slot said slave device is supposed to access the out-of-band communication channel. For instance, said set of rules uses as input the identifier of the slave device to output information representative of the time slot within which said slave device is supposed to access the out-of-band communication channel.

According to a second embodiment of the beacon message, the beacon message includes, for each time slot, second discriminating information representative of each slave device that is allowed to transmit a signalling signal within said time slot. It has to be understood that said second discriminating information may be representative of plural slave devices.

According to a particular embodiment of said second embodiment, the second discriminating information is a subset of identifier bits (with implicitly or explicitly respective positions of said bits in the identifier) such that all slave devices that are identified by an identifier comprising said subset of identifier bits (at the corresponding positions) are allowed to access the out-of-band communication channel within said time slot. For instance, when two time slots are defined, the master device 110 may indicate that one time slot is dedicated to slave devices having "01" as the two lowest bits of their respective identifiers, and the other time slot is dedicated to the other slave devices. According to a more particular embodiment, the discriminating information for at least one time slot is obtained by the master device 110 from identifier bits successfully decoded, if any, from the signalling signal that was under reception when the collision occurred. For instance, the master device 110 indicates in the beacon message that two time slots are defined, that one of said time slot allows slave devices having an identifier matching an identifier part successfully decoded from the signalling signal that was under reception when the collision occurred to access the out-of-band communication channel within said time slot. Therefore all slave devices identified by an identifier having a part matching said identifier part successfully decoded are allowed to access the out-of-band communication channel within said time slot. The master device 110 further indicates in the beacon message that the other time slot allows slave devices having an identifier not matching the identifier part successfully decoded from the signalling signal that was under reception when the collision occurred to access the out-of-band communication channel within said other time slot. Other slave devices identified by an identifier not having a part matching said identifier part successfully decoded are allowed to access the out-of-band communication channel during said other time slot. By relying on identifier bits successfully decoded from the signalling signal that was under reception when the collision occurred to define the second discriminating information associated with one time slot, the master device 110 thus limits the risk of a further occurrence of a collision within said time slot.

According to another particular embodiment, the beacon message further requests, for each time slot, that complementary identifier bits be included in the signalling signal to be transmitted within said time slot. Preferably, the beacon message includes, for each time slot, information representative of which identifier bits (bits positions) are expected to be transmitted in a signalling signal that is later on transmitted in said time slot in response to the beacon message. The complementary identifier bits are identifier bits that complement the subset of identifier bits used as the second discriminating information, if any, associated with the concerned time slot. In such a way, discrimination between potential slave devices concurrently access said time slot, especially in the case where at least one of said slave device is joining the passive optical communications network, is made easier.

When a collision might occur in a time slot because the second discriminating information doesn't allow identifying a single slave device, the master device 110 preferably manages the potential collision by transmitting a second padding message as detailed hereafter.

As apparent from the explanation above, the master device 110 initiates the temporary time-slotted access to the out-of-band communication channel, so as to restrict access to the out-of-band communication channel using a predetermined rule of time slot distribution among slave devices likely to concurrently access the out-of-band communication channel using carrier wavelengths substantially identical as those having involved said collision.

In a step S402, the master device 110 starts receiving at least one signalling signal within at least one respective time slot defined by the transmitted beacon message.

Once the master device 110 starts receiving a signalling signal within one time slot, the master device 110 preferably transmits, in a step S403, a second padding message. The second padding message preferably includes third discriminating information attempting to distinguish the slave device transmitting the signalling signal that was already under reception within said time slot when the collision occurred, if any, from another slave device transmitting the signalling signal that would generate the collision. The second padding message aims at limiting collisions within said time slot by forcing unwanted slave devices to stop transmitting signalling signals within said time slot. Transmitting the second padding message is therefore a preventive measure, since the second padding message aims at being transmitted prior to any collision occurrence regarding the signalling signal that triggered the transmission of the second padding message. The second padding message is transmitted by the master device 110 via the out-of-band communication channel by using a carrier frequency that is a downlink carrier frequency matching the nominal frequency of the downlink filter of the set 121 paired with the nominal frequency of the uplink filter of the set 122 that the carrier frequency used for transmitting said signalling signal matches (since communications occur within the same PON). In a variant, the second padding message is transmitted in the in-band communication channel, when in-band communications with the slave devices supposed to have concurrently accessed the out-of-band communication channel in the uplink direction are already setup.

According to a first embodiment of the second padding message, the third discriminating information is at least part of an identifier of the slave device transmitting said signalling signal. More particularly, the signalling signal containing bits of the identifier of the slave device transmitting said signalling signal, the master device 110 forms the second padding message by repeating on a bit by bit basis said signalling signal. The transmission of the second padding message can therefore start before the end of the reception of the signalling signal. The master device 110 therefore attempts decoding said signalling signal as said signalling signal is received. If a collision occurs, the master device 110 may not be able to decode all bits of said signalling signal, and in this case, the master device 110 replaces, when forming the second padding message, bits that the master device 110 was not able to decode, by a symbol period with no signal. The second padding message may therefore contain not all identifier bits of the slave device transmitting the signalling signal that triggered the transmission of the second padding message, since said all bits may not be contained in said signalling message (see further details hereafter) and since the master device 110 may not be able to decode all bits of the signalling signal. It means that the third discriminating information contained in the second padding message may not allow distinguishing said slave device from any other slave device of the passive optical communications network 100, since plural slave device may have respective identifiers having the same bits as the ones decoded by the master device 110 from said signalling signal. It however limits the risk of collision occurrences or at least limits the risk that such collision remains.

According to a second embodiment, when RTT information is known by the slave devices with regard to the master device 110, the third discriminating information is representative of the RTT between the master device 110 and the slave device originating said signalling signal. Since the slave devices are typically spread over a large geographical zone in many contexts of use of such optical communications networks, the length of the optical fiber between the master device 110 and one slave device usually differs from the length of the optical fiber between the master device 110 and any other slave device. It means that the RTT information helps discriminating one slave device from any other having received the beacon message and having further considered being allowed to transmit a signalling signal within the concerned time slot. Therefore, the master device 110 is able to determine the RTT between the slave device originating said signalling signal and the master device 110 since the time difference from the transmission of the beacon until the reception of the retransmitted signalling signal is equal to:

$$RTT+T0+\varepsilon$$

wherein $\varepsilon$ represents a processing time of the beacon message, which can be estimated under laboratory conditions and an estimation thereof can be stored during manufacturing process.

According to a third embodiment, when the uplink filters of the set 122 are of flat-top type and when the carrier frequency used for retransmitting the signalling signal is supposed to match the flat-top passband of the concerned uplink filter, the third discriminating information is representative of a Received Signal Strength Indication (RSSI) measured by the master device 110 when receiving the retransmitted signalling signal. Knowing beforehand according to specifications of the passive optical communications network 100 what is the transmission power level to be used by the slave devices within the PON, said information representative of the RSSI provides information representative of the signal attenuation from the slave device having trigged the transmission of the second padding message. Then, knowing beforehand according to specifications of the passive optical communications network 100 what is the transmission power level to be used by the master device 110, each slave device is able to determine, from signals received from the master device 110, what is the RSSI of said signals. The uplink path from one slave device to the master device 110 and the downlink path from the master device 110 to said slave device involving substantially the same attenuation, it means that the RSSI information helps discriminating one slave device from any other having received the beacon message and having further considered being allowed to transmit a signalling signal within the concerned time slot.

In a step S404, the master device 110 continues receiving the signalling signal that implied the transmission of the second padding message in the step S403. When the second padding message consists of a repetition of said signalling signal, the master device 110 forms and transmits (via the out-of-band communication channel) the second padding message as the signalling signal is received. In other words, the master device 110 doesn't wait that the signalling signal is completely received before starting transmitting the second padding message.

In a step S405, the master device 110 processes the received part of the signalling signal. The master device 110 attempts decoding signalling information contained in the received part of the signalling signal, e.g. in order to form the second padding message, as the signalling signal is received. The step S405 is then preferably performed in parallel to the step S404 and to the step S403.

FIG. 5 schematically represents an algorithm, performed by each slave device 141, 142, 143, for transmitting signalling signals to the master device 110 via the out-of-band communication channel. Let's illustratively consider that the algorithm of FIG. 5 is performed by the slave device 141.

The algorithm of FIG. 5 is executed when the slave device 141 detects that a first signalling signal has to be transmitted to the master device 110. At that time, no time-slotted access to the out-of-band communication channel is set up, and the slave devices are supposed to asynchronously access to the out-of-band communication channel. A collision might occur with another signalling signal concurrently transmitted by another slave device via the out-of-band communication channel, when the carrier wavelengths respectively used by the slave device 141 and said other slave device match each other.

In a preferred embodiment, before executing the algorithm of FIG. 5, the slave device 141 checks whether a padding message (first padding message according to the terminology used herein before) is under reception. When such a padding message is under reception, the slave device 141 waits that said padding message be completely received, and further as far as the time slotted access to the out-of-band communication channel ends, plus possibly a guard interval of predefined duration, before effectively initiating the execution of the algorithm of FIG. 5. Another approach is that, when such a padding message is under reception, the slave device 141 waits that said padding message be completely received plus a guard interval of predefined duration aiming at ensuring that the time-slotted access is ended, before effectively initiating the execution of the algorithm of FIG. 5.

In a step S501, the slave device 141 starts transmitting the first signalling signal via the out-of-band communication channel.

In a step S502, the slave device 141 checks whether the first signalling signal is fully transmitted. When said first signalling signal is fully transmitted, a step S506 is performed; otherwise, a step S503 is performed.

In the step S503, the slave device 141 checks whether a first padding message (as transmitted by the master device 110 in the step S302) is received or under reception (the slave device 141 might be in position to start decoding the first padding message whereas part of the first padding message is not yet received). When such a first padding message is received or under reception, a step S504 is performed; otherwise, the step S501 is performed in which the slave device 141 continues transmitting the first signalling signal.

In the step S504, the slave device 141 checks whether, according to the first discriminating information included in the first padding message, the slave 141 is still elected to transmit the first signalling signal. The first padding message intends to avoid, or at least limit, collisions in the out-of-band communication channel. Since the slave device 141 might be in position to start decoding the first padding message whereas part of the first padding message is not yet received, the slave device 141 preferably checks whether the slave device 141 is still elected, according to said first discriminating information, on a bit by bit basis. In other words, each time one bit of said first discriminating information is decoded by the slave device 141, said slave device 141 checks whether the slave device 141 is still elected. When the slave device 141 is still elected, the step S501 is performed in which the slave device 141 continues transmitting the first signalling signal; otherwise, a step S505 is performed.

As indicated with regard to FIG. 3, the transmission of the first padding message is an optional feature. When the master device 110 is by design not supposed to transmit any first padding message, the slave device 141 performs the step S502 as follows, after having checked whether the first signalling signal is fully transmitted: when said first signalling signal is fully transmitted, the step S506 is performed; otherwise, the step S501 is performed in which the slave device 141 continues transmitting the first signalling signal.

In the step S505, the slave device 141 stops the transmission of the first signalling signal, the slave device 141 having detected that said slave device 141 is no more elected to access the out-of-band communication channel. Then the step S506 is performed.

In the step S506, the slave device 141 checks whether a beacon message is received or under reception from the master device 110. As already explained with regard to FIG. 4, such a beacon message would be representative of a collision detected by the master device 110. When no beacon message is received before the end of the transmission of the first signalling signal or within a predefined time frame after the end of the transmission of the first signalling signal, a step S507 is performed in which the algorithm of FIG. 5 ends (this should not occur of the slave device 141 had to stop the transmission of the first signalling signal by executing the step S505); otherwise, a step S508 is performed.

In the step S508, the slave device 141 determines the duration of the time-slotted access, which may be predefined or be defined within the beacon message, and determines whether there is a time slot after the reception of the beacon message in which the slave device 141 is elected to transmit a second signalling signal. The second signalling signal may be identical to the first signalling signal. The second signalling signal may differ from the first signalling signal, e.g. when the master device 110 requests in the beacon message that complementary identifier bits be transmitted in the scope of the time-slotted access to the out-of-band communication channel.

The distribution of the time slots among the slave devices may be predefined according to the aforementioned set of rules. In this case, each slave device knows said set of rules and knows therefrom, according to the quantity of time slots of the time-slotted access to the out-of-band communication channel, within which time slot said slave device is supposed to access the out-of-band communication channel. For instance, said set of rules uses as input the identifier of the slave device so as to output information representative of the time slot within which said slave device is supposed to access the out-of-band communication channel.

As indicated with regard to FIG. 4, the beacon message includes in a variant, for each time slot of temporary time-slotted access to the out-of-band communication channel, second discriminating information representative of each slave device that is allowed to transmit a signalling signal within said time slot. The slave device 141 therefore checks whether the second discriminating information contained in the beacon message for one time slot indicates that said slave device 141 is elected to transmit within said time slot. When the second discriminating information contained in the beacon message for each time slot doesn't indicates that said slave device 141 is elected to retransmit the signalling signal, the algorithm of FIG. 5 ends (not shown in FIG. 5 for simplicity considerations). Otherwise, the slave device 141 performs a step S509.

In the step S509, the slave device 141 waits for the beginning of the time slot within which the slave device 141 is elected to transmit the second signalling signal. As already indicated with regard to FIG. 4, the beacon message implicitly or explicitly informs the slave devices about the quantity of time slots defining the time-slotted access to the out-of-band communication channel, and implicitly or explicitly informs the slave devices about the instant at which starts the time-slotted access to the out-of-band communication channel, and implicitly or explicitly informs the slave devices about the respective durations of the time slots. The slave device 141 is then able to determine at which instant starts the time slot within which the slave device 141 is elected to transmit the second signalling signal. Once the instant at which said time slot starts is reached, the slave device 141 starts transmitting the second signalling signal in the step S509. When the beacon message requests that complementary identifier bits be included in the signalling signal transmitted in response to the beacon message within said time slot, the slave device 141 forms the second signalling signal by modifying the first signalling signal so as to replace, or alternatively to complement, the identifier bits that were contained in the first signalling signal by the requested complementary bits of the identifier of the slave device 141.

In a step S510, the slave device 141 checks whether the second signalling signal is fully transmitted. When said second signalling signal is fully transmitted, the step S507 is performed; otherwise, a step S511 is performed.

In the step S511, the slave device 141 checks whether a second padding message (as transmitted by the master device 110 in the step S403) is received or under reception (the slave device 141 might be in position to start decoding the padding message whereas part of the padding message is not yet received). When such a second padding message is received or under reception, a step S512 is performed; otherwise, the step S509 is performed in which the slave device 141 continues transmitting the second signalling signal.

In the step S512, the slave device 141 checks whether, according to the third discriminating information included in the second padding message, the slave device 141 is still elected to transmit the second signalling signal within the concerned time slot. Indeed, the second discriminating information included in the beacon message for said time slot may not have been enough to avoid that plural slave devices access the out-of-band communication channel during said time slot. The second padding message therefore intends to avoid, or at least limit, collisions within the concerned time slot of the time-slotted access of the out-of-band communication channel. Since the slave device 141 might be in position to start decoding the second padding message whereas part of the second padding message is not yet received, the slave device 141 preferably checks whether the slave device 141 is still elected, according to said third discriminating information, to access the out-of-band communication channel within the concerned time slot, on a bit by bit basis. In other words, each time one bit of said third discriminating information is decoded by the slave device 141, said slave device 141 checks whether the slave device 141 is still elected. When the slave device 141 is still elected, the step S509 is performed in which the slave device 141 continues transmitting the second signalling signal; otherwise, a step S513 is performed in which the slave device 141 stops the transmission of the second signalling signal, the slave device 141 having detected that said slave device 141 is no more elected to access the out-of-band communication channel within the concerned time slot. Then the step S507 is performed.

FIG. 6 schematically represents an algorithm, performed by the master device 110, for initiating a collision detection mechanism for detecting collisions of signalling signals respectively transmitted by slave devices via the out-of-band communication channel.

In a step S601, the master device 110 starts receiving a signalling signal via the out-of-band communication channel. The step S601 corresponds to the step S301. Independently of the implementation of the temporary time-slotted access to the out-of-band communication channel, plural signalling signals may be concurrently received by the master device 110. As the probability that the master device 110 starts receiving signalling signals from two or more respective slave devices exactly at the same instant is rather low, the master device 110 typically starts receiving a first signalling signal from a first slave device and may potentially start receiving a second signalling signal from a second slave device while the first signalling signal is still under reception, which means in that case that a collision occurs when the carriers wavelengths in use match each other.

In a step S602, the master device 110 activates a timer having a predefined duration Ts. The duration Ts equals a symbol period on the out-of-band communication channel.

In a step S603, the master device 110 launches the collision detection mechanism. One embodiment of the collision detection mechanism is detailed hereafter with regard to FIG. 7.

In a step S604, the master device 110 performs oversampling of the signal received in the step S601, so as to obtain samples thereof. The oversampling is performed by using a frequency that corresponds to a sampling frequency used for the in-band communications, or a submultiple derived therefrom (i.e. from the sampling frequency used for the in-band communications). The oversampling is such that the quantity of samples thus obtained per symbol period is enough high to consider that noise over the out-of-band communication channel is self-compensated over said quantity of samples. This allows reusing, for the collision detection within the scope of the out-of-band communication channel, components of the master device 110 that are normally designed for processing in-band signals.

In a step S605, the master device 110 provides the samples obtained in the step S604 to the collision detection mechanism, until expiry of the timer activated in the step S602. Once expiry of the timer is reached, the step S601 is repeated and the signal under reception, if still present, is processed for another symbol period.

In a particular embodiment, the master device 110 only provides to the collision detection mechanism the samples obtained in the step S604 up to an instant that corresponds to the expiry of the timer minus a margin Ma, wherein the margin Ma intends to withdraw, from the samples analysed by the collision detection mechanism, samples that are related to inter-symbol transitions.

FIG. 7 schematically represents an algorithm, performed by the master device 110, of one embodiment for implementing the collision detection mechanism.

In a step S701, the master device 110 collects the samples, as obtained by the over-sampling operation performed in the step S604 during one symbol period. It is reminded that the signalling signals as transmitted by the slave devices are modulated according to a predefined modulation scheme, and therefore the signalling signals are respectively transmitted in the form of (modulation) symbols over successive symbol periods.

In a step S602, the master device 110 checks the magnitude of at least one parameter of the collected samples. Each said parameter is one parameter among amplitude, phase, and frequency and is chosen for checking magnitude variations thereof according to the modulation that was applied on said signal for transmission via the out-of-band communication channel.

According to a particular embodiment, PSK or Differential PSK modulation is used by the slave devices for transmitting the signalling signals via the out-of-band communication channel, and amplitude is said parameter chosen for checking magnitude variations thereof. Indeed, since the out-of-band communication channel is quasi-static due to the optical nature of the medium (optical fiber), it means that the signalling signal's envelope is expected to be substantially constant over each symbol period.

According to a particular embodiment in variant, said parameter chosen for checking magnitude variations thereof is one parameter among amplitude, phase, and frequency, on which the modulation that was applied on said signal for transmission via the out-of-band communication channel acted. In ASK modulation or the like, amplitude is the parameter on which the modulation acts; in PSK modulation or the like, phase is the parameter on which the modulation acts; in FSK modulation or the like, frequency is the parameter on which the modulation acts; in QAM (Quadrature Amplitude Modulation) modulation or the like, amplitude and phase are the parameters on which the modulation acts; etc.

In a step S703, the master device 110 checks whether variations in magnitude of each considered parameter of the collected samples is greater than a respective predefined threshold TH. When plural parameters of the samples are considered, each parameter is compared with a corresponding threshold TH. For example, in QAM modulation, the amplitude of the samples can be compared with an amplitude threshold and/or the phase of the samples can be compared with a phase threshold. It can also be noted that, even though QAM modulation is used, only one parameter among phase and amplitude may be checked by the master device 110 for collision detection.

According to one embodiment, the master device 110 checks said variations by determining a difference between a maximum value of said parameter(s) and a maximum value of said parameter(s) within said symbol period.

According to another embodiment, the master device 110 compares the magnitude of at least one parameter of each sample with the magnitude of the same parameter(s) of the immediately preceding sample in sequence.

According to yet another embodiment, the master device 110 checks said variations by forming groups of consecutive samples within each symbol period. For instance, the groups of samples are defined as respective adjacent windows of predefined size (consisting of a predefined quantity of samples). In a preferred embodiment, the groups of samples are defined thanks to a sliding window of predefined size, iteratively shifted by one or more samples within the considered symbol period, from the definition of one group of samples to the definition of the immediately following group of samples in sequence. The master device 110 thus checks said variations by determining differences between the integrated values of said parameter(s) for each couple of consecutive groups of samples within the considered symbol period.

When the variations in magnitude of each considered parameter of the collected samples is greater than the predefined threshold TH, a step S704 is performed; otherwise, a step S705 is performed. The predefined threshold TH equals to or is greater than noise variance over the out-of-band communication channel regarding said parameter with the variations of magnitude of which the threshold TH is compared. In that sense, the threshold TH depends on the modulation applied to transmit the signalling signal via the out-of-band communication channel.

In the step S704, the master device 110 considers that a collision is detected on the out-of-band communication channel. Then, a step S706 is performed.

In the step S705, the master device 110 considers that no collision is detected on the out-of-band communication channel. Then, the step S706 is performed.

In the step S706, the master device 110 stops the collision detection mechanism (all samples of the symbol period have been processed). If another symbol period has to be processed, a new iteration of the step S603 is expected to launch once again the collision detection mechanism.

As previously described, collisions can be detected by the master device 110 and the risk of occurrence of such collisions by temporarily setting time-slotted access to the out-of-band communication channel. Moreover, the risk of occurrence of such collisions may be further reduced. To achieve this, it is proposed that the signalling information, including identifying information aiming at identifying the slave device that transmits the signalling information contained in the transmitted signalling signals from the slave devices via the out-of-band communication channel be as short as possible. The proposal is to reduce the size of the identifying information by attempting limiting said identifying information to bits allowing discriminating the slave device transmitting the signalling information from the other slave devices likely to concurrently access the out-of-band communication channel. To achieve this goal, the master device transmits information representative at least of a mask that said slave devices have to apply to respective full identifiers so as to obtain respective reduced identifying information to be used by said slave devices within further signalling information to be respectively transmitted by said slave devices, the reduced identifying information aiming at containing enough bits to enable distinguishing the slave device from each other. The aforementioned mask may then be transmitted using the out-of-band communication channel in the downlink direction. The aforementioned mask may then be transmitted, in a variant, by using the in-band communications in the downlink direction. Usage of such a mask is detailed hereafter in a preferred embodiment of dynamically defining said mask upon appearance or disappearance of slave devices in the passive optical communications network 100. In this context, each slave device joining the passive optical communications network 100 preferably has to be announced to the master device 110, so that the master device 110 is able to know which slave devices are present in the passive optical communications network 100. This is detailed hereafter with regard to FIGS. 8 and 9.

FIG. 8 schematically represents an algorithm, performed by the master device 110, for processing signalling signals, containing announcing signalling information, received via the out-of-band communication channel.

In a step S801, the master device 110 receives an announcing signalling information including at least part of the identifier of the slave device having transmitted said announcing signalling information. Said signalling information is so-called announcing signalling information since the slave device having transmitted said signalling information uses said signalling information to announce its presence in the passive optical communications network 100. Said announcing signalling information is typically part of the initial locking process implemented for locking the carrier frequency used by said slave device to enable uplink communications toward the master device 110. An algorithm implemented by said slave device for transmitting the announcing signalling information is described hereafter with regard to FIG. 9.

In a following step S802, the master device 110 determines whether the announcing signalling information includes only part of the identifier of the slave device having transmitted said announcing signalling information or the full identifier of the slave device having transmitted said announcing signalling information. When the announcing signalling information includes only part of the identifier of the slave device having transmitted said announcing signalling information, a step S803 is performed; otherwise, a step S806 is performed. The identifiers of the slave devices are typically represented using a predefined quantity of bits, e.g. sixty-four bits or one hundred and twenty eight bits. The master device 110 determines whether the announcing signalling information includes a subset only of said predefined quantity of bits. To do so, the announcing signalling information contains information allowing to determine the quantity of bits used by the slave device to provide information identifying said slave device. The master device 110 typically knows in advance, from the quantity of bits used by the slave device to provide information identifying said slave device, which bits (bits respective positions) among said predefined quantity of bits are included in said signalling information, e.g. the so-called less significant bits (as denominated by the one skilled in the art). Informing about the quantity of bits used by the slave device to provide information identifying said slave device may be done using field delimiters or by relying on a field with predefined size and position. In a variant, the quantity of bits used by the slave device to provide information identifying said slave device is predefined and known in advance by the master device 110. For instance, the signalling information contains information about the type of signalling information and one type of signalling information is defined for including a full device identifier and another type of signalling information is defined for including such a partial device identifier.

When each slave device is supposed to include its full identifier in announcing signalling information, the step S803 is omitted and the algorithm directly moves from the step S801 to the step S806. On the contrary, when each slave device is supposed to include a part only of its full identifier in announcing signalling information, the step S803 is omitted and the algorithm directly moves from the step S803 to the step S806.

In the step S803, the master device 110 compares said part of the identifier, as received in the announcing signalling information, with stored identifying information. Said stored identifying information is a list, or a table, or more generally a database, of full or partial identifiers of each slave device that is known, by the master device 110, to be already present in the concerned PON. In other words, the master device 110 checks whether said part of the identifier, as received in the announcing signalling information, matches said full or partial identifiers stored in said database. The comparison is performed with respect to the position of the bits of said part of the identifier included in the announcing signalling information among said predefined quantity of bits used to represent the full identifiers of the slave devices.

In a following step S804, the master device 110 checks whether said part of the identifier, as received in the announcing signalling information, is sufficient to discriminate the slave device, which has transmitted said announcing signalling information, from each slave device known, by the master device 110, to be already present in the concerned PON. When the comparison performed in the step S803 shows that said part of the identifier matches at least one of the full or partial identifiers stored in the database, the quantity of bits forming said part of the identifier, as received in the announcing signalling information, is not sufficient to perform such discrimination. The master device 110 would therefore need to get extended identifier information or another part of the full identifier of said slave device in order to be able to distinguish said slave device from the other slave devices known, by the master device 110, to be already present in the concerned PON. When said part of the identifier, as received in the announcing signalling information, is sufficient to perform the discrimination, the step S806 is performed; otherwise, a step S805 is performed.

In the step S805, the master device 110 requests, to the slave device that has transmitted the announcing signalling information received in the step S801, further identifying information, since the part of the identifier, as received in the announcing signalling information, is not sufficient to perform the discrimination. The request may implicitly or explicitly indicate which bits of the full identifier of said slave device are requested: according to a first example, the request implicitly indicates that the slave device shall reattempt transmitting the announcing signalling information but with all the bits of the full identifier of said slave device; according to a second example, the request implicitly or explicitly indicates that the slave device shall reattempt transmitting the announcing signalling information with a predefined supplementary quantity of bits of the full identifier of said slave device, e.g. double the quantity B of bits of the part of the identifier as received in the announcing signalling information, for instance such that the 2*B less significant bits of the full identifier of said slave device are transmitted. The algorithm of FIG. 8 is then expected to be reiterated when receiving a new announcing signalling information from said slave device in response to the request transmitted by the master device 110 in the step S805.

According to a particular embodiment, the master device 110 builds said request such that said request explicitly indicates which bits of the full identifier of said slave device is expected to include in the new announcing signalling information in response to the request transmitted by the master device 110 in the step S805. Indeed, the master device 110 is able to determine which identifier bits allow discriminating the slave devices already present in the PON from each other. The probability is rather high that said bits further allow discriminating the slave device, which has transmitted the announcing signalling information received in the step S801, from the slave devices already present in the concerned PON. Therefore, the master device 110 may build said request such that said request explicitly indicates that said slave device shall include said bits in the new announcing signalling information to be transmitted in response to the request transmitted by the master device 110 in the step S805.

Once the step S805 is performed, the algorithm of FIG. 5 ends.

It can be noticed that collisions may occur when said slave device transmits the announcing signalling information. In this case, the already-mentioned first padding message is transmitted, as already explained with regard to FIG. 3. Moreover, the master device 110 can use the beacon message in order to request identifier bits of the slave device that have high probability to discriminate said slave device from the other slave devices known, by the master device 110, to be already present in the concerned PON.

In the step S806, the master device 110 stores in the database the full identifier as received in the step S801, or the part of the full identifier as received in the step S801, according to whichever is effectively received in the step S801. The full identifier or identifier part stored in the database allows then to identify the slave device, which has transmitted the announcing signalling information received in the step S801, from the other slave devices.

In a following step S807, the master device 110 determines discriminating bits that enable discriminating any and all slave devices of the concerned PON from each other. In other words, the master device 110 determines which identifier bits (i.e. bits respective positions among the quantity of bits needed to represent the full identifiers of the slave devices) are strictly necessary to be transmitted during further signalling information transmission to determine which slave device has transmitted said signalling information.

Then in a step S808, the master device 110 determines a mask and implicitly at least one shift depth (related to the positions of the bits to quote from the full identifiers), which enable to retain only said discriminating bits from the full identifiers of the slave devices. The mask enables extracting the values of the discriminating bits and the shift depth(s) enable(s) obtaining said values in a contiguous way starting from the first bit position (as if said bits were the so-called less significant bits). Let's illustratively consider that the discriminating bits are the bits from the fifth bit position to the eighth bit position (the first bit position being the so-called least significant bit of the identifier), said mask enables extracting the respective values of said bits from a full identifier onto which the mask is applied, and one shift depth enables shifting said extracted bits to a range going from the first bit position to the fourth bit position. It has to be noted that several shift depths are used when the mask enables extracting the values of non contiguous discriminating bits, so as to obtain, after shifting operations in accordance with said shifting depths, values of contiguous bits starting from the first bit position.

Once the mask and implicitly the shift depth(s) are determined, the master device 110 transmits information representative of said mask and shift depth(s), via the out-of-band communication channel, or using the in-band communication channel, at least toward the slave device that transmitted the announcing signalling information received in the step S801. In case the obtained mask differs from a preceding mask that was applicable to the slave devices that were already present in the concerned PON, the master device 110 broadcast an updated mask to the slave devices, which is therefore applicable to all said slave devices. The terminology "broadcast" is used herein with its broad meaning of contacting all the slave devices.

To transmit data toward the slave device having transmitted the announcing signalling information received in the step S801, the master device 110 uses a carrier frequency that is a downlink carrier frequency matching the nominal frequency of the downlink filter of the set 121 paired with the nominal frequency of the uplink filter of the set 122 that the carrier frequency used for transmitting said announcing signalling signal matches (since communications occur in the same PON).

Then, the master device 110 processes any other piece of signalling information that is contained, if any, in the announcing signalling information received in the step S801. Once the step S808 is performed, the algorithm of FIG. 8 ends.

The transmission of the mask has been more particularly described with regard to FIG. 8 in response to an announcing signalling information transmitted by each slave device joining the passive optical communications network 100. The mask may be also transmitted by the master device 110 on a regular basis, using either the out-of-band communication channel in the downlink direction or the in-band communications channel in the downlink direction. This latter approach allows slave devices to know which identifier bits to include in their announcing signalling information when said slave devices join the passive optical communications network 100.

FIG. 9 schematically represents an algorithm, performed by each slave device joining the passive optical communications network 100 (i.e. announcing its presence in the passive optical communications network 100 to the master device 110), for transmitting announcing signalling information via the out-of-band communication channel. Let's illustratively consider that the algorithm of FIG. 9 is performed by the slave device 141.

In a step S901, the slave device 141 obtains at least a part of the identifier of the slave device 141, to be transmitted within such an announcing signalling information via the out-of-band communication channel to the master device 110. To do so, the slave device 141 quotes a predefined quantity of bits, the respective positions of which being predefined, from the full identifier of the slave device 141. Only the quoted bits are about to be transmitted in the announcing signalling information for identifying the slave device 141. In a variant, the slave device 141 may include in the announcing signalling information the full identifier of the slave device 141. The quantity of bits quoted from the full identifier of the slave device 141, and their respective positions, are typically predefined. For instance, a default mask and implicitly at least one default shift depth are stored in memory of the slave device 141 during manufacturing or at initialisation of the slave device 141, and are applied (as described above) by the slave device 141 in the step S901. Only the quoted bits are then retained as identifying information representative of the slave device 141 in said announcing signalling information. At this stage, the slave device 141 is not able to know whether the quoted bits would be sufficient to discriminate said slave device 141 from the other slave devices likely to concurrently access the out-of-band communication channel with regard to the slave device 141. This is up to the master device 110 to determine whether the quoted bits would be sufficient to discriminate said slave device 141 from the other slave devices likely to concurrently access the out-of-band communication channel with regard to the slave device having transmitted the announcing signalling information received in the step S801, as already explained with regard to FIG. 8. Indeed, if the master device 110 determines that the quoted bits are sufficient to discriminate said slave device 141 from the other slave devices likely to concurrently access the out-of-band communication channel with regard to the slave device 141, said slave device 141 is supposed to receive, at least, a mask, from the master device 110, in response to the announcing signalling information; otherwise, the said slave device 141 is supposed to receive a request for further identifying information, from the master device 110, in response to the announcing signalling information.

In another embodiment, the quantity of bits quoted from the full identifier of the slave device 141, and their respective positions, are determined from a mask transmitted by the master device 110 using either the out-of-band communication channel, or the in-band communications channel, in the downlink direction. Said mask has been defined by the master device 110 from the identifiers of the slave devices known by the slave device as already present in the concerned PON, so as to enable distinguishing said slave devices from each other. Said mask might need to be updated by the master device 110 due to appearance in the passive optical communications network 100 of the slave device 141, but there is a non negligible probability that the mask already applicable would remain applicable to distinguish the slave device 141 from the other slave devices likely to concurrently access the out-of-band communication channel.

In a following step S902, the slave device 141 transmits, toward the master device 110 via the out-of-band communication channel, the announcing signalling information including the full identifier or part of the full identifier as identifying information, according to whichever was obtained in the step S901.

When the announcing signalling information includes a part only of the full identifier, a step S903 is performed; otherwise, a step S904 is directly performed.

In the step S903, the slave device 141 checks whether the identifying information included in the announcing signalling information has been sufficient for the master device 110 to discriminate the slave device 141 from the other slave devices known, by the master device 110, to be already present in the concerned PON. In other words, the slave device 141 checks whether the master device 110 transmitted, in response to the announcing signalling information, a request for further identifying information or, at least, a mask. When the slave device 141 received from the master device 110, in response to the announcing signalling information, a request for further identifying information, a step S906 is performed; otherwise, the step S904 is performed.

In the step S904, the slave device 141 receives information representative of a mask and at least one shift depth, which enable to retain only, from the full identifier of the slave device 141, discriminating bits allowing discriminating the slave device 141 from the slave devices likely to concurrently access the out-of-band communication channel with regard to the slave device 141. Said information representative of the mask and the shift depth(s) corresponds to the one transmitted by the master device 110 in the step S808. The slave device 141 is thus able to determine, from the full identifier of the slave device 141 and from said mask and from said shift depth(s), a discriminating reduced identifier allowing discriminating the slave device 141 from the other slave devices, as already explained with regard to FIG. 8. Only the discriminating bits are thus retained as identifying information representative of the slave device 141 in said further signalling information.

In a following step S905, the slave device 141 uses said discriminating reduced identifier, as identifying information, in further signalling information to be transmitted via the out-of-band communication channel. The discriminating reduced identifier is then, by definition, supposed to allow the master device 110 knowing that said further signalling information comes from the slave device 141, and said further signalling information is shorter than if said further signalling information would have contained the full identifier of the slave device 141, which therefore reduces the risk of collision occurrences via the out-of-band communication channel. The algorithm of FIG. 9 then ends.

In the step S906, the slave device 141 obtains further identifying information compared with the part of the full identifier included in the announcing signalling information transmitted in the step S902. The request for further identifying information received from the master device 110 may implicitly or explicitly indicate which bits of the full identifier of said slave device are requested: according to the first example already mentioned with regard to the step S805, the request implicitly indicates that the slave device shall reattempt transmitting the announcing signalling information but with all the bits of the full identifier of said slave device; according to the second example already mentioned with regard to the step S805, the request implicitly or explicitly indicates that the slave device 141 shall reattempt transmitting the announcing signalling information with a predefined supplementary quantity of bits of the full identifier of the slave device 141, e.g. double the quantity B of bits of the part of the identifier as received in the announcing signalling information, for instance such that the 2*B less significant bits of the full identifier of said slave device are transmitted. Said predefined supplementary quantity of bits of the full identifier of the slave device 141 may be only known by the slave device 141 (the request indicates that more bits are requested without indicating how many, and the slave device 141 decides on its own how many supplementary bits to provide, e.g. on the basis of a default value stored in memory during manufacturing or at initialisation).

In a following step S907, the slave device 141 transmits, toward the master device 110 via the out-of-band communication channel, a new announcing signalling information including the full identifier or part of the full identifier as further identifying information as obtained in the step S906, according to whichever was implicitly or explicitly requested by the master device 110. Then the step S903 is repeated.

If after having transmitted the announcing signalling information in the step S902, the slave device 141 doesn't receive any response (either a mask or a request for further identifying information) within a predefined timer duration, the slave device 141 modifies the configuration of its optical transmission interface so as to use another carrier wavelength. This process is repeated until the carrier wavelength used by the slave device 141 matches the passband of the uplink filter of the set 122 enabling the slave device 141 to transmit data to the master device 110.

It has to be noticed that is advantageous that the master device 110 stores in the database full identifiers of the slave devices instead of only partial identifiers of slave devices, since the mask used for extracting discriminating bits relies on identifying information stored in the database of the master device 110 with regard to the slave devices, and since such a mask is likely to evolve over time according to appearance or disappearance of slave devices, in/from the passive optical communications network 100. Therefore, in a particular embodiment in which the announcing signalling information received beforehand respectively contain only partial identifiers, once in-band communications are setup from the concerned slave device to the master device 110, said slave device transmits its full identifier to the master device 110 via the in-band communications. The master device 110, upon reception of said full identifier via the in-band communications, retrieves from the database the previously stored partial identifier for said slave device. To do so, the master device 110 applies the mask applicable to said slave device onto the received full identifier, and performs the necessary shifting operations, and performs a comparison with the partial identifiers stored in the database. Once a match is found, the partial identifier of said slave device is found, and the master device 110 stores said full identifier in replacement of the partial identifier previously stored.

According to a first embodiment, disappearance of a slave device can be detected by the master device 110 thanks to a message transmitted by said slave device right before powering down, or right before moving into sleep mode, to indicate that said slave device leaves the passive optical communications network 100. According to a second embodiment, disappearance can be detected by implementing a timer of predefined duration, activating each time there is a data exchange between the master device and said slave device, and by considering that the slave device left the passive optical communications network 100 when the timer expires before having performed a new data exchange between the master device and said slave device. It means that such exchanges are supposed to usually occur more frequently than said predefined duration of the timer.

In the description above, the usage of the aforementioned mask so as to determine the reduced identifying information for each slave device is detailed in a dynamic update context according to appearance of slave devices in the passive optical communications network 100. It can be understood that the same principles would apply in a dynamic update context according to disappearance of slave devices from the passive optical communications network 100. The mask might then be updated upon detecting said disappearance, which may reduce the quantity of identifier bits strictly needed to distinguish the slave devices likely to concurrently access the out-of-band communication channel.

FIG. 10 schematically represents an algorithm, performed by each slave device, for transmitting signalling information (other than the aforementioned announcing signalling information) via the out-of-band communication channel, when the aforementioned mask has to be applied. Let's illustratively consider that the algorithm of FIG. 10 is performed by the slave device 141.

In a step S1001, the slave device 141 detects that signalling information (further signalling information with regard to the aforementioned announcing signalling information) has to be transmitted via the out-of-band communication channel toward the master device 110. For instance, such further signalling information is a locking signal for carrier wavelength detuning tracking, enabling the master device 110 to perform measurements onto said locking signal in order to determine whether the configuration of the optical transmission interface of the slave device 141 has to be adjusted so as to correspond to a carrier wavelength that matches the passband of the filter of the set 122 via which the slave device 141 is supposed to communicate toward the master device 110.

In a following step S1002, the slave device 141 obtains information representative of a mask for obtaining a discriminating reduced identifier from the full identifier of the slave device 141. Said mask is the one for which information representative thereof was transmitted by the master device 110 to the slave device 141 (possibly via broadcast) in the step S808 (which means that said mask has been received by the slave device 141 following a processing of announcing signalling information transmitted by another slave device having joined or left the passive optical communications network 100 after said slave device 141). The slave device 141 then applies said mask and corresponding shift depth(s) so as to obtain contiguous bits from the first bit position (as if all these bits were the so-called less significant bits). Only the bits corresponding to the discriminating reduced identifier are kept as identifying information to be included in said further signalling information.

In a following step S1003, the slave device 141 builds said further signalling information, in which the slave device 141 includes the discriminating reduced identifier as obtained in the step S1002.

In a following step S1004, the slave device 141 transmits, toward the master device 110 via the out-of-band communication channel, said further signalling information. Then the algorithm of FIG. 10 ends.

FIG. 11 schematically represents an algorithm, performed by the master device 110, for processing said further signalling information transmitted via the out-of-band communication channel according to the algorithm of FIG. 5, when the aforementioned mask has to be applied.

In a step S1101, the master device 110 receives said further signalling information, including a part only (discriminating reduced identifier) of the full identifier of the slave device having transmitted said further signalling information. In case said further signalling information includes the full identifier of the slave device having transmitted said further signalling information, a step S1105 is directly performed.

In a following step S1102, the master device 110 obtains identifying information included said further signalling information and aiming at identifying the slave device having transmitted said further signalling information in a unique way among the slave devices likely to concurrently access the out-of-band communication channel with regard to the slave device having transmitted the announcing signalling information received in the step S1101.

In a following step S1103, the master device 110 identifies the slave device having transmitted said further signalling information from the identifying information obtained in the step S1102.

In a following step S1104, the master device 110 processes any other piece of signalling information that is contained in said further signalling information received in the step S1101. Once the step S1104 is performed, the algorithm of FIG. 11 ends.

The mask, which has been introduced herein before with regard to FIGS. 8 to 11, can be used to define the second discriminating information, which has been already mentioned with regard to FIG. 4 and which is used in the scope of the algorithm of FIG. 5 by slave devices in order to determine, in a particular embodiment, whether said slave device are respectively allowed to access the time slots. Indeed, said second discriminating information is, in this case, typically value(s) of one or more bits of identifier that can be extracted via said mask (since the identifier bits extracted by the mask allows discriminating the slave devices from each other). Use of such a mask limits cases where complementary bits have to be requested via the beacon message (such request for complementary bits would be useful more especially when a new slave device joins the passive optical communications network 100 and has a full identifier that renders obsolete the mask applicable so far).

According to a variant embodiment, in order to reduce the size of the identifying information, the master device 110 performs a translation of a vendor identifying part present in the identifier of each slave device present in the concerned PON. Indeed, many passive optical communications networks comprise devices manufactured by very few different vendors, and the identifiers of said devices comprises a large quantity of bits for identifying the respective vendors of said devices. For instance, when devices manufactured by only two different vendors are present in the passive optical communications network 100, a single bit is necessary to distinguish both vendors. By performing such a translation according to the quantity of different vendors by which the slave devices present in the passive optical communications network 100 have been manufactured, the size of the identifying information included in the signalling information is reduced. To do so, the master device 110 provides to the slave devices of the concerned PON a translation table providing association of vendors identifier part with codes having a shorter size defined according to the quantity of the different vendors by which the slave devices present in the passive optical communications network 100 have been manufactured, so that said slave devices replace, in the signalling information as transmitted, the vendor identifier parts of their respective identifiers by the corresponding codes as indicated in said table. Said table is preferably provided via in-band communications, but may alternatively be provided via the out-of-band communication channel.

The invention claimed is:

1. A method for controlling access to an out-of-band communication channel in an optical communications network comprising a master device and slave devices connected to the master device via optical fiber, the optical communications network being adapted to enable in-band communications, the out-of-band communication channel being intended to enable transmissions of signalling signals with respect to the in-band communications, collisions occurring in the out-of-band communication channel when plural slave devices access the out-of-band communication channel by using respective carrier wavelengths that match each other, characterized in that the master device performs:

processing signalling signals transmitted by said slave devices without access restriction to the out-of-band communication channel;

and upon detecting a collision between signalling signals transmitted by slave devices concurrently accessing the out-of-band communication channel:

initiating a temporary time-slotted access to the out-of-band communication channel, so as to restrict access to the out-of-band communication channel, using a predetermined rule of time slot distribution among slave devices likely to concurrently access the out-of-band communication channel using carrier wavelengths substantially identical as those having involved the detected collision.

2. The method according to claim 1, characterized in that, upon receiving a signalling signal out of said temporary time-slotted access and prior to any collision occurrence with said signalling signal, the master device transmits a first so-called padding message representative of the fact that said signalling signal is under reception, towards the slave devices likely to concurrently access the out-of-band communication channel using carrier wavelengths substantially identical as the one of said signalling signal.

3. The method according to claim 2, characterized in that the first padding message contains first discriminating information attempting to distinguish the slave device transmitting the signalling signal that was already under reception when the collision occurred, if any, from another slave device transmitting the signalling signal that would generate the collision.

4. The method according to claim 3, characterized in that, each signalling signal containing identifying information aiming at identifying the slave device transmitting said signalling signal, the master device attempts decoding symbols of the signalling signal under reception, and in that the master device forms the first padding message so as to include therein symbols successfully decoded from said signalling signal thus forming said first discriminating information.

5. The method according to claim 1, characterized in that, upon detecting said collision, the master device transmits a so-called beacon message representative of said collision, towards the slave devices likely to concurrently access the out-of-band communication channel using carrier wavelengths substantially identical as the ones of the signalling signals having generated said collision, the beacon message informing said slave devices about the instant at which starts the time-slotted access to the out-of-band communication channel.

6. The method according to claim 5, characterized in that the beacon message includes, for each time slot, second discriminating information representative of each slave device that is allowed to transmit a signalling signal within said time slot.

7. The method according to claim 6, characterized in that said second discriminating information is a subset of identifier bits with respective bits positions in said identifier such that the slave devices that are identified by an identifier comprising said subset of bits at said positions are allowed to access the out-of-band communication channel within said time slot.

8. The method according to claim 5, characterized in that the beacon message further requests, for each time slot, that complementary identifier bits be included in the signalling signal to be transmitted within said time slot.

9. The method according to claim 1, characterized in that, upon receiving a signalling signal within one time slot of said temporary time-slotted access and prior to any collision occurrence with said signalling signal, the master device transmits a second so-called padding message representative of the fact that said signalling signal is under reception, towards the slave devices likely to concurrently access the out-of-band communication channel using carrier wavelengths substantially identical as the one of said signalling signal.

10. The method according to claim 9, characterized in that the second padding message contains third discriminating information attempting to distinguish the slave device transmitting the signalling signal that was already under reception within said time slot when the collision occurred, if any, from another slave device transmitting the signalling signal that would generate the collision.

11. The method according to claim 10, characterized in that, each signalling signal containing identifying information aiming at identifying the slave device transmitting said signalling signal, the master device attempts decoding symbols of the signalling signal under reception within said time slot, and in that the master device forms the second padding message so as to include therein symbols successfully decoded from said signalling signal thus forming said third discriminating information.

12. The method according to claim 10, characterized in that said third discriminating information is representative of a round-trip time between the master device and the slave device transmitting the signalling signal that was already under reception within said time slot when the collision occurred, if any.

13. The method according to claim 10, characterized in that said third discriminating information is representative of a Received Signal Strength Indication measured by the master device from the signalling signal that was already under reception within said time slot when the collision occurred, if any.

14. The method according to claim 1, characterized in that, the signalling information being in the form of modulation symbols over successive symbol periods, the master device performs, for detecting collisions in the out-of-band communication channel:

receiving a signal via the out-of-band communication channel;

oversampling the received signal starting from an instant of reception of said signal, so as to obtain samples thereof, by using a frequency that corresponds to a sampling frequency used for the in-band communications, or to a submultiple derived therefrom, such that the quantity of samples thus obtained per symbol period is enough high to consider that noise over the out-of-band communication channel is self-compensated over said quantity of samples;

checking variations of magnitude of at least one parameter of the samples on a per symbol period basis, each said parameter being one parameter among amplitude, phase, and frequency and being chosen for checking said variations according to the modulation that was applied on said signal for transmission via the out-of-band communication channel; and detecting a collision when the variations of each said parameter are greater than a predefined threshold equal to or greater than noise variance over the out-of-band communication channel regarding said parameter.

15. The method according to claim 1, characterized in that the master device transmits, to each slave device likely to concurrently access the out-of-band communication channel, information representative at least of a mask that said slave devices has to apply to respective full identifiers of said slave devices so as to obtain respective reduced identifying information to be used by said slave devices within further signalling information to be respectively transmitted by said slave devices, the reduced identifying information for each slave device aiming at containing enough bits according to said mask to enable distinguishing said slave device from the other slave devices likely to concurrently access the out-of-band communication channel.

16. The method according to claim 15, characterized in that the master device performs:

receiving, via the out-of-band communication channel, a so-called announcing signalling information; and transmitting, in response to said announcing signalling information, the information representative at least of said mask.

17. The method according to claim 1, characterized in that the master device provides to the slave devices a translation table providing association of vendors identifier part with codes having a shorter size defined according to the quantity of the different vendors by which the slave devices present in the passive optical communications network have been manufactured, so that said slave devices replaces, in the signalling information as transmitted, the vendor identifier parts of their respective identifiers by the corresponding codes as indicated in said table.

18. The method according to claim 1, characterized in that an optical transmission interface of said slave device has to be adjusted for transmitting optical signals to the master device via an optical band-pass filter, the master device having an optical reception interface configured to enable receiving optical signals output by said optical band-pass filter and transmitted by said slave device on a carrier wavelength when said carrier wavelength is comprised in the passband of the optical band-pass filter, said carrier wavelength being a priori unknown and/or said passband of the optical band-pass filter being a priori unknown, and wherein said signalling information is used to lock said carrier wavelength with respect to said passband of the optical band-pass filter.

19. A master device for controlling access to an out-of-band communication channel in an optical communications network comprising the master device and slave devices connected to the master device via optical fiber, the optical communications network being adapted to enable in-band communications, the out-of-band communication channel being intended to enable transmissions of signalling signals with respect to the in-band communications, collisions occurring in the out-of-band communication channel when plural slave devices access the out-of-band communication channel by using respective carrier wavelengths that match each other, characterized in that the master device implements:

a processor to process signalling signals transmitted by said slave devices without access restriction to the out-of-band communication channel;

and upon to detect a collision between signalling signals transmitted by slave devices concurrently accessing the out-of-band communication channel: and an initiator to initiate a temporary time-slotted access to the out-of-band communication channel, so as to restrict access to the out-of-band communication channel, using a predetermined rule of time slot distribution among slave devices likely to concurrently access the out-of-band communication channel using carrier wavelengths substantially identical as those having involved the detected collision.

* * * * *